(12) United States Patent
Tani et al.

(10) Patent No.: US 10,938,467 B2
(45) Date of Patent: Mar. 2, 2021

(54) TRANSMITTING STATION, CONTROL STATION, RECEIVING STATION, DATA TRANSMISSION SYSTEM, AND DATA TRANSMISSION METHOD

(71) Applicant: Mitsubishi Electric Corporation, Chiyoda-ku (JP)

(72) Inventors: Shigenori Tani, Tokyo (JP); Hiroyasu Sano, Tokyo (JP); Katsuyuki Motoyoshi, Tokyo (JP); Akinori Fujimura, Tokyo (JP); Futaba Ejima, Tokyo (JP); Kyoichiro Izumi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 157 days.

(21) Appl. No.: 15/568,512

(22) PCT Filed: Apr. 30, 2015

(86) PCT No.: PCT/JP2015/063013
§ 371 (c)(1),
(2) Date: Oct. 23, 2017

(87) PCT Pub. No.: WO2016/174774
PCT Pub. Date: Nov. 3, 2016

(65) Prior Publication Data
US 2018/0145740 A1 May 24, 2018

(51) Int. Cl.
*H04B 7/08* (2006.01)
*H04B 7/10* (2017.01)
(Continued)

(52) U.S. Cl.
CPC ............... *H04B 7/082* (2013.01); *H04B 7/10* (2013.01); *H04L 1/0003* (2013.01); *H04L 1/06* (2013.01);
(Continued)

(58) Field of Classification Search
CPC combination set(s) only.
See application file for complete search history.

(56) References Cited

U.S. PATENT DOCUMENTS 6,075,484 A    6/2000   Daniel et al.
6,421,528 B1 *   7/2002   Rosen ............... H04B 7/18513
                                              455/67.16
(Continued)

FOREIGN PATENT DOCUMENTS

EP    1 052 785 A1    11/2000
JP    11-251821 A    9/1999
(Continued)

OTHER PUBLICATIONS

Partial Supplementary European Search Report dated Nov. 28, 2018 in corresponding European Patent Application No. 15890757.6, 16 pages.
(Continued)

*Primary Examiner* — Junpeng Chen
(74) *Attorney, Agent, or Firm* — Oblon, McClelland, Maier & Neustadt, L.L.P.

(57) ABSTRACT

A transmitting station includes a transmitting antenna whose orientation direction is changeable, and a controller that controls the orientation direction of the transmitting antenna according to an orientation direction of the transmitting antenna determined together with receiving stations to receive data transmitted from the transmitting antenna based on estimate values of received signal quality at receiving stations that are candidates for receiving stations to receive
(Continued)

data transmitted from the transmitting antenna. The transmitting station can maintain received signal quality at a plurality of receiving stations at a desired value or more in a data transmission system.

32 Claims, 18 Drawing Sheets

(51) Int. Cl.
    *H04L 27/00* (2006.01)
    *H04L 1/00* (2006.01)
    *H04L 1/06* (2006.01)
    *H04W 24/02* (2009.01)
    *H04W 72/08* (2009.01)

(52) U.S. Cl.
    CPC ............ *H04L 27/00* (2013.01); *H04W 24/02* (2013.01); *H04W 72/085* (2013.01)

(56) References Cited

U.S. PATENT DOCUMENTS

| | | | | |
|---|---|---|---|---|
| 2003/0231706 | A1* | 12/2003 | Hwang | H04L 1/0003 375/219 |
| 2004/0972015 | | 5/2004 | Abe et al. | |
| 2005/0276317 | A1* | 12/2005 | Jeong | H04B 7/0689 375/213 |
| 2006/0291599 | A1 | 12/2006 | Strodtbeck et al. | |
| 2008/0056181 | A1* | 3/2008 | Imamura | H04L 1/0026 370/329 |
| 2008/0153433 | A1 | 6/2008 | Pallonen et al. | |
| 2008/0165840 | A1 | 7/2008 | Morris et al. | |
| 2010/0309793 | A1* | 12/2010 | Choi | H04L 1/0027 370/252 |
| 2011/0188561 | A1* | 8/2011 | Mizrahi | H04B 1/1027 375/227 |
| 2013/0121269 | A1* | 5/2013 | Nammi | H04L 25/03343 370/329 |
| 2013/0252625 | A1* | 9/2013 | Benjebbour | H04W 16/02 455/452.1 |
| 2014/0016932 | A1 | 1/2014 | Coleman et al. | |
| 2014/0133471 | A1* | 5/2014 | Nammi | H04L 1/06 370/336 |
| 2014/0266867 | A1 | 9/2014 | Liu et al. | |
| 2014/0334392 | A1* | 11/2014 | Gage | H04L 5/0092 370/329 |

FOREIGN PATENT DOCUMENTS

| | | |
|---|---|---|
| JP | 2000-4215 A | 1/2000 |
| JP | 2001-85924 A | 3/2001 |
| JP | 2001-94494 A | 4/2001 |
| JP | 2002-543436 A | 12/2002 |
| JP | 2003-198440 A | 7/2003 |
| JP | 2008-109557 A | 5/2008 |
| JP | 2014-123897 A | 7/2014 |

OTHER PUBLICATIONS

Mario Cossu et al., "Effects of Link Availability on the Achievable Performance with Variable Coding Modulation Earth Observation Satellites", Satellite Telecommunications (ESTEL), 2012 IEEE First AESS European Conference on, IEEE, XP032296696,Oct. 2, 2012, pp. 1-7.

Extended European Search Report dated Mar. 20, 2019 in Patent Application No. 15890757.6, 15 pages.

ETSI EN 302 307-1, "*Digital Video Broadcasting(DVB); Second generation framing structure, channel coding and modulation systems for Broadcasting, Interactive Services, News Gathering and other broadband satellite applications; Part 1: DVB-S2*", European Telecommunications Standards, Nov. 2014, Institute Technical Specification, V1.4.1, pp. 1-80.

ITU-R P. 618-11, "*Propagation data and prediction methods required for the design of Earth-space telecommunication systems*", Radiocommunication Sector of ITU (International Telecommunication Union), Sep. 2013, pp. 1-26 (28 pages).

International Search Report dated Jun. 9, 2015 in PCT/JP2015/063013, filed on Apr. 30, 2015.

* cited by examiner

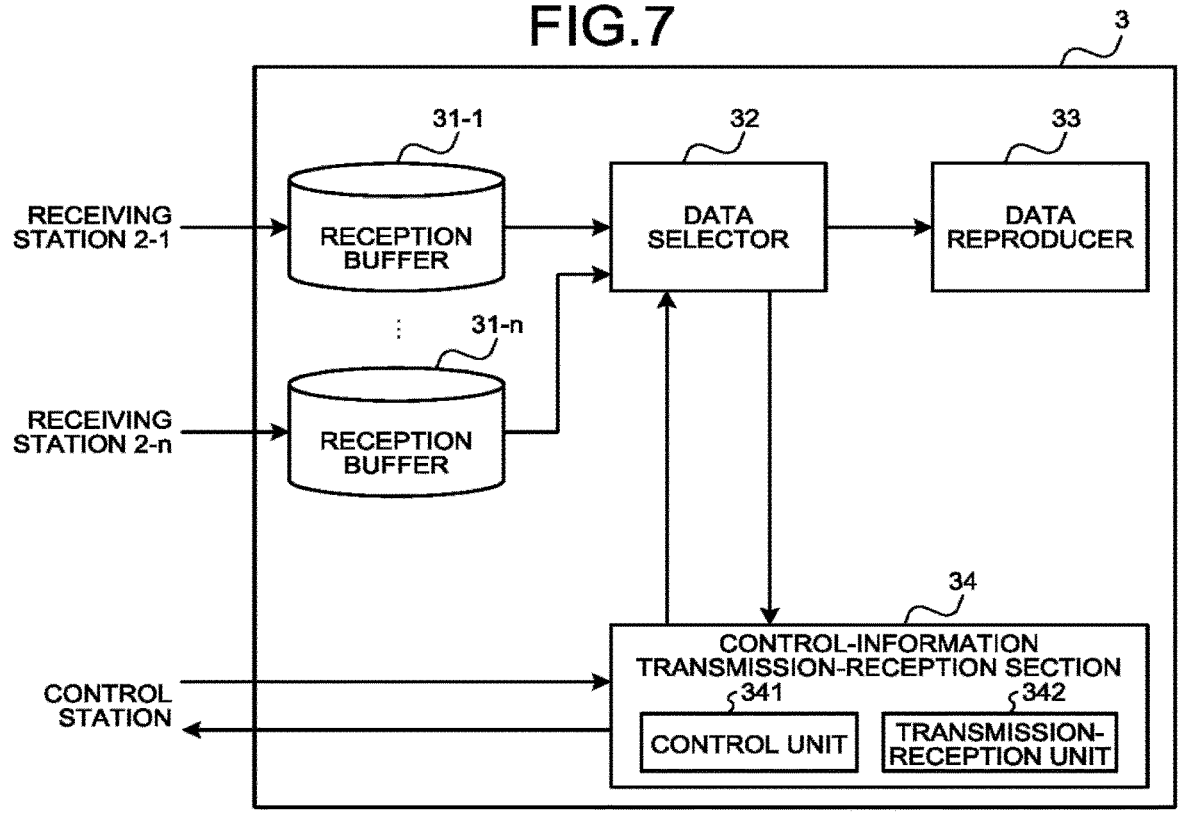
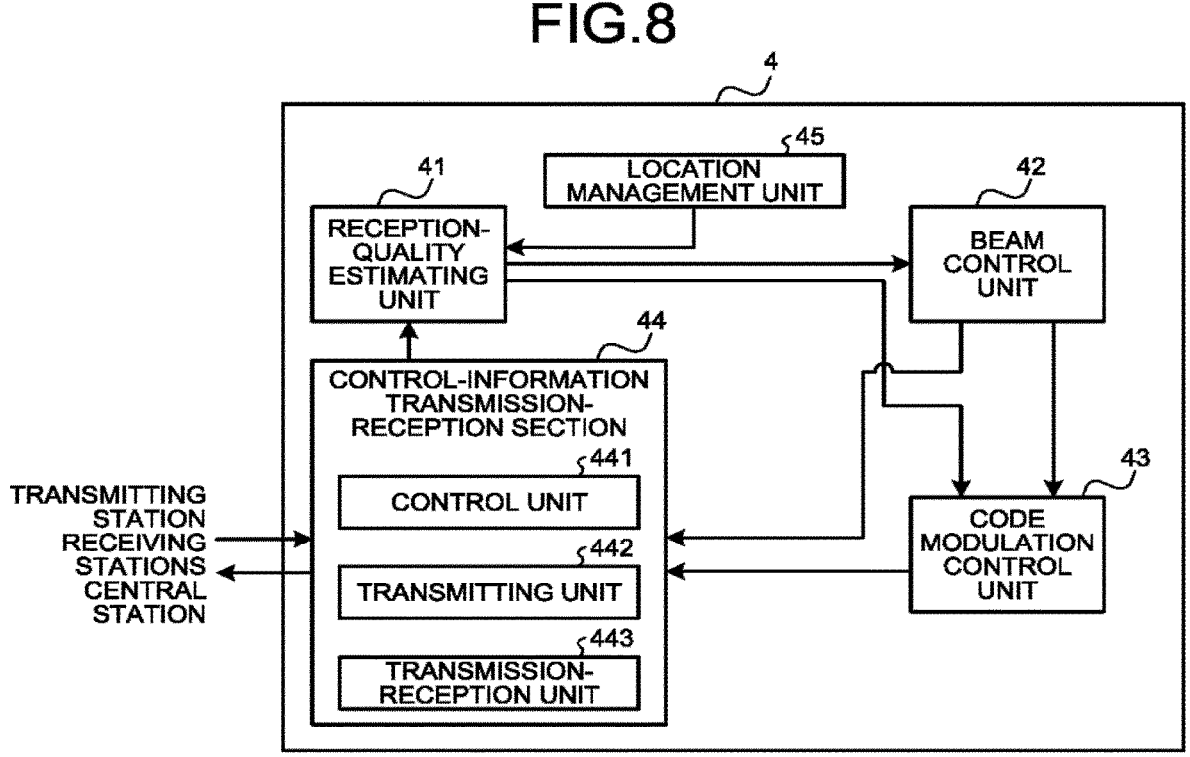

| ELEVATION ANGLE | CODE MODULATION PATTERN #0 | CODE MODULATION PATTERN #1 |
|---|---|---|
| 5 DEGREES | 0 | 3 |
| 10 DEGREES | 1 | 4 |
| ⋮ | ⋮ | ⋮ |
| 85 DEGREES | 12 | 16 |
| 90 DEGREES | 13 | 17 |

FIG.24
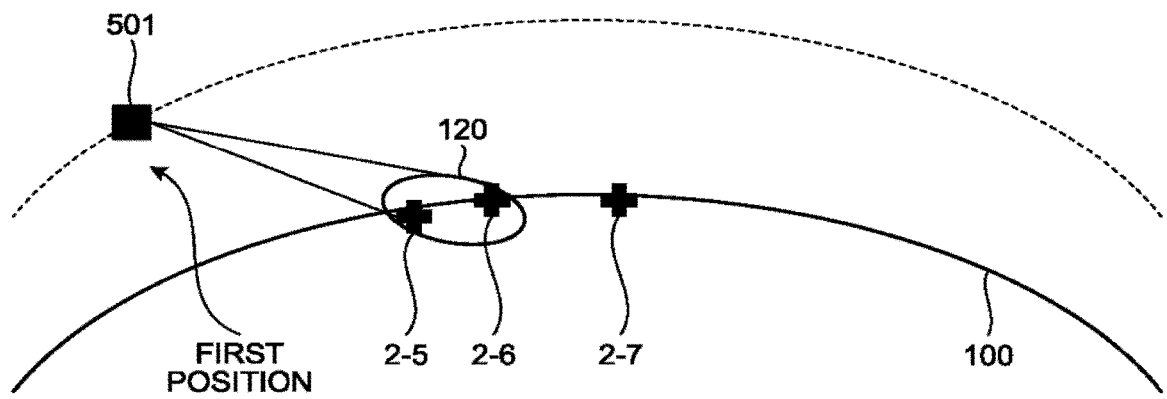
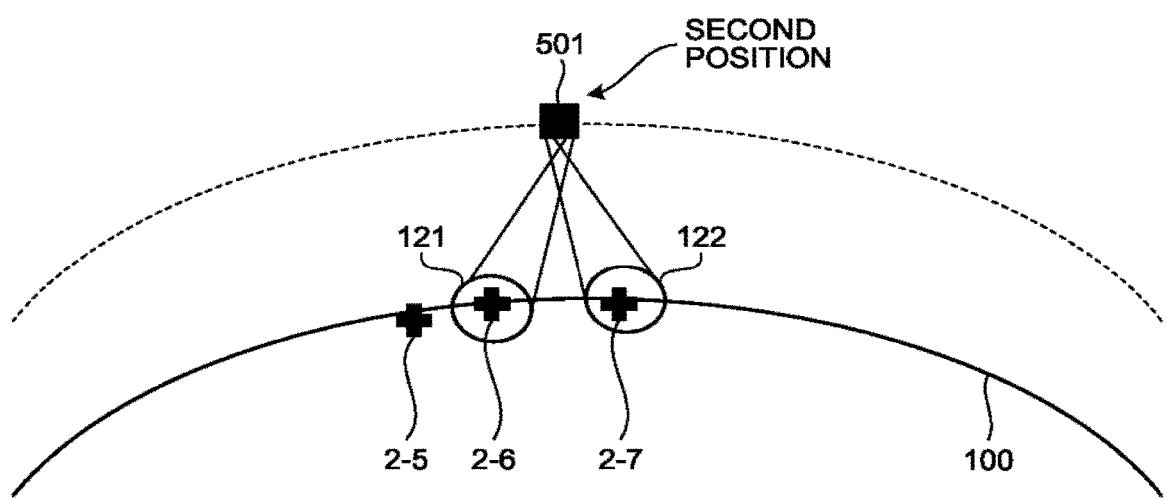
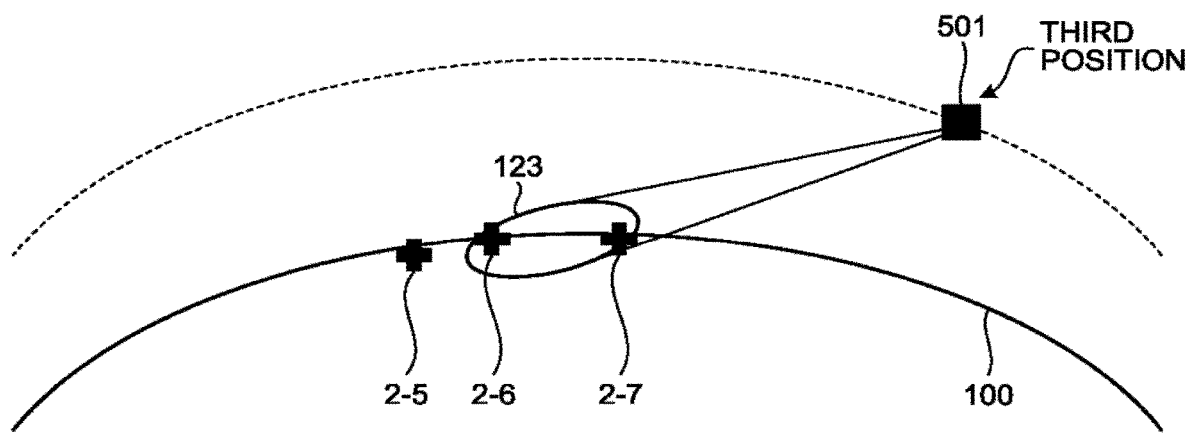

TRANSMITTING STATION, CONTROL STATION, RECEIVING STATION, DATA TRANSMISSION SYSTEM, AND DATA TRANSMISSION METHOD

FIELD

The present invention relates to a transmitting station, a control station, a receiving station, and a data transmission method in a data transmission system that transmits data as radio signals.

BACKGROUND

Data transmission systems in which data obtained using artificial satellites such as observation satellites operating in the earth orbit in the outer space is transmitted from the artificial satellites or the like to receiving stations on the Earth have been introduced. In recent years, with an increase in the precision of observation equipment mounted in the observation satellites the amount of data transmitted by the observation satellites has been increasing. Thus, in order to transmit the data at higher speeds than ever before, the data transmission systems using a band of 26 GHz or the like in which a wide band is available are being studied. Hereinafter, artificial satellite is abbreviated as satellite.

In the data transmission systems using the satellites, signal attenuation such as rain attenuation due to rain, snow, or the like occurs when the receiving stations receive the signals transmitted from the satellites. In particular, as the frequency band becomes higher, the amount of attenuation of signals due to rain increases. Thus, various methods are being studied as measures against the rain attenuation. The measures against the rain attenuation include, for example, the site diversity using a plurality of the receiving stations and the adaptive modulation.

The site diversity using a plurality of the receiving stations is, as described in Non Patent Literature 1, for example, a method in which a plurality of the receiving stations disposed on the Earth receives the data transmitted by the transmitting station mounted in the satellite, and the central station receives the data from the plurality of the receiving stations and synthesizes the received data. The probability that a plurality of receiving stations geographically separated is all in rain at the same time is lower than the probability that single receiving station is in rain. Thus, using the above-described site diversity, the probability that the signal attenuation occurs due to rain can be reduced, as compared to the case where the single receiving station is used. Consequently, using the above-described site diversity, the probability that the central station can receive the data correctly, that is, the probability that received data agrees with the data transmitted from the transmitting station becomes higher than the probability that the single receiving station, the receiving station can receive data correctly by using a single receiving station. When the above-described site diversity is used, the capability of the correct reception means that the data synthesized by the central station is correct data.

Adaptive modulation is the scheme to change a modulation scheme, a code rate, and the like of transmission signals in accordance with received signal quality. The adaptive modulation is a method referred to as adaptive coding and modulation (ACM) or variable coding and modulation (VCM) in Non Patent Literature 2, for example. This method performs the control to reduce a modulation level and a code rate when reception quality is low, and increase the modulation level and the code rate when the reception quality is high. This control enables transmission and reception satisfying a desired error rate.

As described above, the use of the site diversity can reduce the probability that the signal attenuation occurs due to rain or the like, as compared to the case where the single receiving station is used. This reduces the amount of rain attenuation that should be estimated in the channel design, and thus increases a design value in the received signal quality. Consequently, the modulation level and the code rate can be set higher to improve throughput.

CITATION LIST

Non Patent Literature

Non Patent Literature 1: International Telecommunication Union (ITU-R) P. 618-11, September 2013

Non Patent Literature 2: European Telecommunications Standards Institute Technical Specification (ETSI TS) 302 307-1 V1.4.1, November 2014

SUMMARY

Technical Problem

When the frequency band for data transmission rises with the increase in the data amount of data observed by the satellite, the beam pattern of a beam formed by the transmitting antenna with the same antenna diameter becomes narrow in range. The beam pattern is a pattern indicating radiation characteristics of tele antenna, and is expressed as the gain of the antenna according to the angle from the center of the antenna, for example. The beam pattern having the narrow range means that the range of the angle at which the gain of the antenna is greater than or equal to a threshold is narrow. When the beam pattern of the beam formed by the transmitting antenna becomes narrow in range, the footprint which is the region on the ground surface that the beam can cover decreases its area. The region on the ground surface that the beam can cover is a region on the ground surface in which the gain of the transmitting antenna is greater than or equal to a threshold, for example. On the other hand, when the antenna diameter is reduced, the beam pattern becomes wider in range, but the gain of the transmitting antenna decreases, thus disadvantageously degrading reception quality.

An orbiting satellite such as a satellite in a synchronous sub-recurrent orbit varies in the ground path of the satellite orbit. Thus, the elevation angle of the satellite at the receiving station and the distance between the receiving station and the satellite vary depending on the location in the orbit of the satellite, so that the shape and area of the beam emitted by the satellite vary. That is, even when the orientation direction of the beam is determined such that the received signal quality at a plurality of the receiving stations performing the site diversity has a desired value, the received signal quality at the receiving stations can disadvantageously fall below the desired value depending on changes in the location of the satellite.

The present invention has been made in view of the above, and has an object of providing the transmitting station capable of allowing the received signal quality at a plurality of the receiving stations to be maintained at a desired value or more.

Solution to Problem

In order to solve the above-described problem and achieve the object, a transmitting station according to the present invention comprises a transmitting antenna whose orientation direction is changeable. This transmitting station also comprises a control unit to control the orientation direction of the transmitting antenna in accordance with an orientation direction of the transmitting antenna determined together with receiving stations to receive data transmitted from the transmitting antenna, on a basis estimate values of received signal quality at candidates for receiving stations to receive data transmitted from the transmitting antenna.

Advantageous Effects of Invention

The transmitting station according to the present invention achieves the effect that the received signal quality at the plurality of the receiving stations can be maintained at the desired value or more.

BRIEF DESCRIPTION OF DRAWINGS

FIG. 7 is a diagram illustrating a configuration example of a central station in the first embodiment.

FIG. 8 is a diagram illustrating a configuration example of a control station in the first embodiment.

FIG. 24 is a diagram illustrating an example of the footprint of a beam of the transmitting station when a beam selection according to the elevation angle is performed in the third embodiment.

DESCRIPTION OF EMBODIMENTS

Hereinafter, a transmitting station, a control station, a receiving station, a data transmission system, and a data transmission method according to embodiments of the present invention will be described in detail with reference to the drawings. The embodiments are not intended to limit the invention.

First Embodiment

Figure 1:
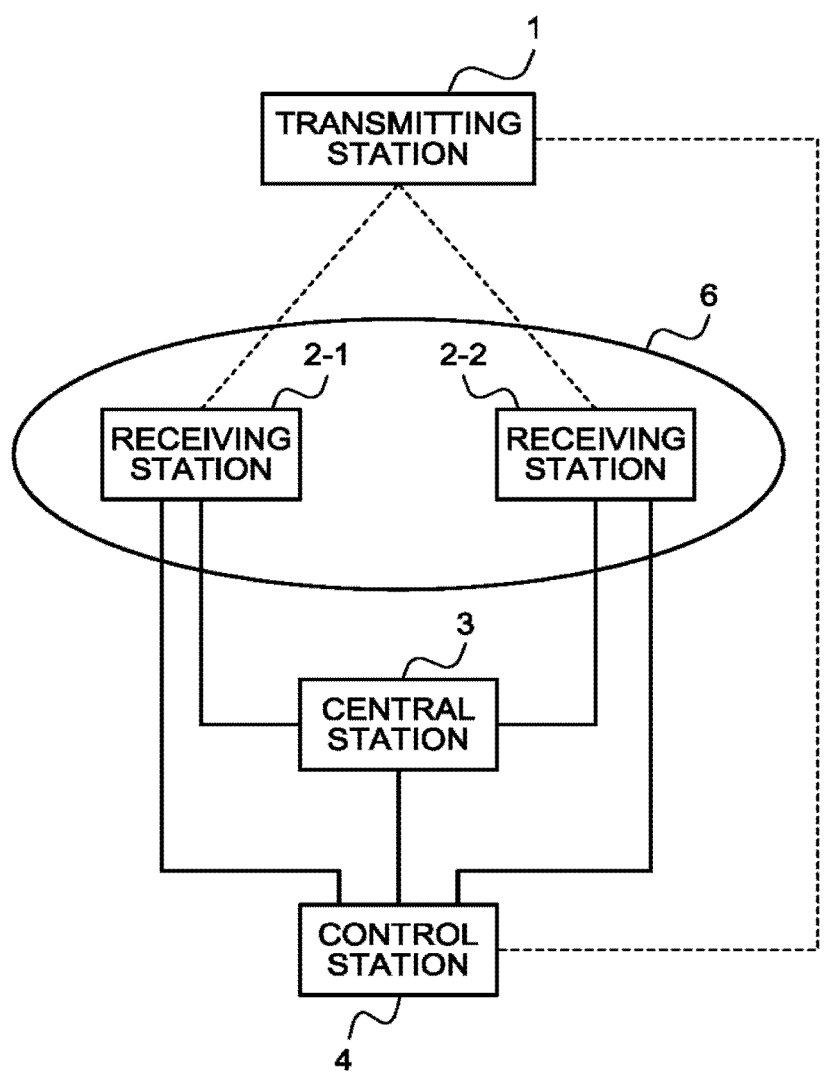
FIG. 1 is a diagram illustrating a configuration example of a data transmission system according to a first embodiment.

FIG. 1 is a diagram illustrating a configuration example of a data transmission system according to a first embodiment of the present invention. The data transmission system in the present embodiment includes a transmitting station 1, receiving stations 2-1 and 2-2, a central station 3, and a control station 4. Although FIG. 1 illustrates only two receiving stations, the number of receiving stations is not limited to this. Hereinafter, when the receiving stations 2-1 and 2-2 are represented without distinction, they are each described a receiving station 2.

The transmitting station 1 is a transmitting apparatus mounted in a satellite. Although an example where the transmitting station 1 is mounted in the satellite is herein described, the transmitting station 1 may alternatively be mounted in an aircraft or the like. The receiving stations 2-1 and 2-2 are installed on the Earth. The central station 3 and the control station 4 are also installed on the Earth. In FIG. 1, dotted lines and solid lines connecting the stations show connection forms between the stations. The dotted lines represent wireless connections, and the solid lines represent wired connections. The transmitting station 1 and the receiving stations 2-1 and 2-2 are wirelessly connected, and the receiving stations 2-1 and 2-2 and the central station 3 are connected by wires. The control station 4 is connected to the receiving stations 2-1 and 2-2 and the central station 3 by wires, and is wirelessly connected to the transmitting station 1. A radio channel between the control station 4 and the transmitting station 1 and a radio channel between the transmitting station 1 and the receiving stations 2-1 and 2-2 are different from each other. The radio channel between the control station 4 and the transmitting station 1 is referred to as a control channel where appropriate, and the radio channel between the transmitting station 1 and the receiving stations 2-1 and is referred to as a data channel where appropriate. The control channel and the data channel are different in frequency, for example.

A footprint 6 shows an area on the ground surface where radio waves emitted by the transmitting station 1 through the data channel can be received. A range of irradiation by the transmitting station 1 through the data channel is called a beam. It is assumed that a communication method using the control channel between the control station 4 and the transmitting station 1 is different from a communication method using the data channel between the transmitting station 1 and the receiving stations 2-1 and 2-2. Thus, an area in which radio waves transmitted by the transmitting station 1 using the control channel can be received may be different from an area in which radio waves emitted by the transmitting station 1 using the data channel can be received.

Figure 2:
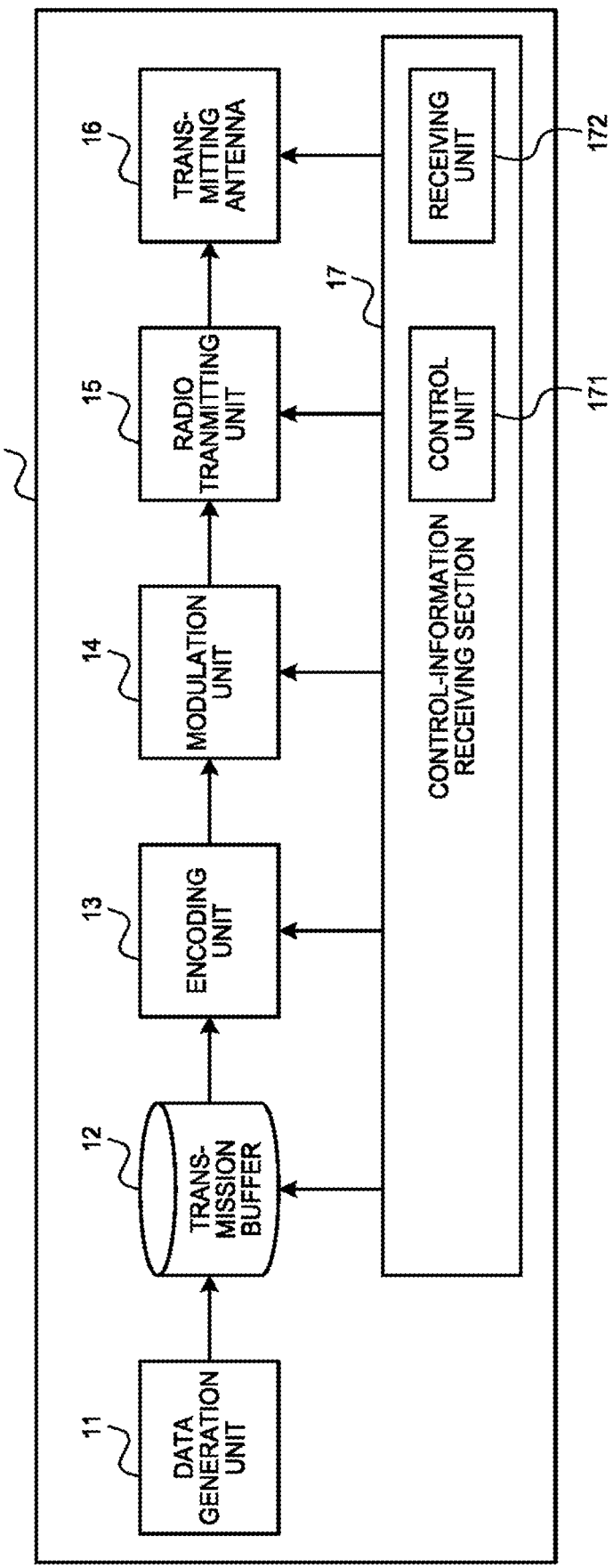
FIG. 2 is a diagram illustrating a configuration example of a transmitting station in the first embodiment.

FIG. 2 is a diagram illustrating a configuration example of the transmitting station 1 in the present embodiment. The transmitting station 1 in the present embodiment includes a data generation unit 11, a transmission buffer 12, an encoding unit 13, a modulation unit 14, a radio transmitting unit 15, a transmitting antenna 16, and a control-information receiving section 17. The data generation unit 11 generates data to be transmitted such as observation information, that is, transmission data. The data generation unit 11 may be, for example, observation equipment or the like, or may be a processing circuit that performs processing such as compression on observation data from observation equipment to generate data to be transmitted. The transmission buffer 12 stores data generated by the data generation unit 11.

The encoding unit 13 encodes data output from the transmission buffer 12, that is, the transmission data. For a code used in encoding at the encoding unit 13, a convolution code, a low-density parity-check (LDPC) code, a Reed-Solomon (RS) code, or the like can be used, but it is not limited to them. The modulation unit 14 modulates the encoded data. As a modulation scheme at the modulation unit 14, for example, quadrature phase-shift keying (QPSK), quadrature amplitude modulation (QAM), or the like can be used, but it is not limited to them. The radio transmitting unit 15 converts the modulated data into a signal of a radio transmission frequency band, amplifies this signal and transmits the amplified signal as a radio signal through the transmitting antenna 16. The transmitting antenna 16 is an antenna whose orientation direction is changeable. The control-information receiving section 17 receives control information from the control station 4, and controls the operations of parts constituting the transmitting station 1 on the basis of the received control information. A receiving unit 172 of the control-information receiving section 17 receives the control information from the control station 4 and inputs this control information to a control unit 171. The control unit 171 of the control-information receiving section 17 controls the operations of the parts constituting the transmitting station 1 on the basis of the input control information.

The control information contains information specifying an orientation direction of the transmitting antenna 16. Specifically, the receiving unit 172 receives from the control station 4 an orientation direction of the transmitting antenna 16 determined at the control station 4 together with receiving stations to receive data transmitted from the transmitting antenna 16, on the basis of estimate values of received signal quality at receiving stations 2 that are candidates for receiving stations to receive the data. The control unit 171 controls the orientation direction of the transmitting antenna 16, in accordance with the orientation direction received by the receiving unit 172. Control performed by the control-information receiving section 17 will be described later. The control information may also include information indicating an encoding scheme and a modulation scheme. In this case, the receiving unit 172 receives from the control station 4 the information indicating an encoding scheme and a modulation scheme determined at the control station 4 on the basis of the estimate values of received signal quality at the receiving stations 2 corresponding to the orientation direction of the transmitting antenna 16. On the basis of the received information indicating the encoding scheme and the modulation scheme, the control unit 171 indicates the encoding scheme to the encoding unit 13, and indicates the modulation scheme to the modulation unit 14. The control information may be in any format. For example, the MOD-COD field described in Non Patent Literature 2 can be used.

The parts illustrated in FIG. 2 can each be implemented as hardware such as an individual device or circuit. The data generation unit 11 is observation equipment or a processing circuit for generating data, or the like. The transmission buffer 12 is a memory. The encoding unit 13 is an encoder. The modulation unit 14 is a modulator or a modem. The radio transmitting unit 15 is a processing circuit including an analog-to-digital converter circuit, a frequency converter circuit, an amplifier circuit, and others. The receiving unit 172 of the control-information receiving section 17 is a receiver. The control unit 171 of the control-information receiving section 17 is a processing circuit that controls the parts on the basis of the control information. The above parts may be configured as individual circuits or devices, or a plurality of functional parts may be configured as a single circuit or device.

The data generation unit 11 (when the unit 11 is the processing circuit for generating data), the control unit 171 in the control-information receiving section 17, the encoding unit 13, and the modulation unit 14 may be dedicated hardware, or may be a control circuit including a memory and a CPU (also called a central processing unit, a central processor, a processing unit, an arithmetic unit, a microprocessor, a microcomputer, a processor, or a digital signal processor (DSP)) that executes programs stored in the memory. Here, the memory corresponds to nonvolatile or volatile semiconductor memory such as random-access memory (RAM), read-only memory (ROM), flash memory, an erasable programmable read-only memory (EPROM), or an electrically erasable programmable read-only memory (EEPROM), or magnetic disk, a flexible disk, an optical disk, a compact disk, a mini disk, a digital versatile disk (DVD), or the like.

When the data generation unit 11 (when the unit 11 is the processing circuit for generating data), the processing circuit in the control-information receiving section 17, the encoding unit 13, and the modulation unit 14 described above are implemented by dedicated hardware, these are, for example, a single circuit, a combined circuit, a programmed processor, a parallel-programmed processor, an application-specific integrated circuit (ASIC), a field-programmable gate array (FPGA), or a combination thereof.

Figure 3:
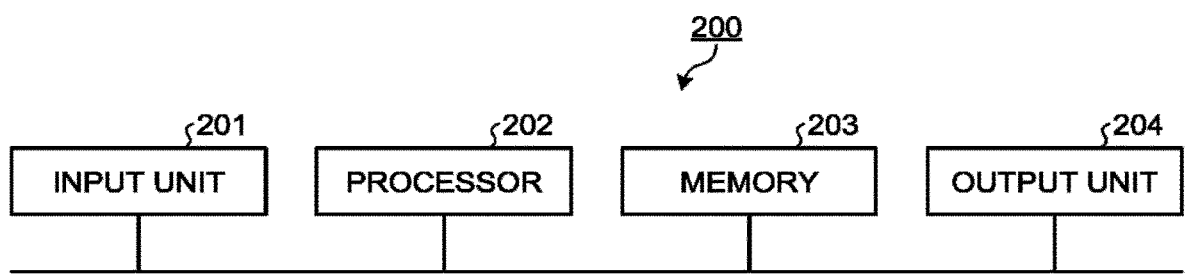
FIG. 3 is a diagram illustrating a configuration example of a control circuit in the first embodiment.

When the data generation unit 11 (when the unit 11 is the processing circuit for generating data), the processing circuit in the control-information receiving section 17, the encoding unit 13, and the modulation unit 14 are implemented by a control circuit including a CPU, the control circuit is, for example, a control circuit 200 of a configuration illustrated in FIG. 3. As illustrated in FIG. 3, the control circuit 200 includes an input unit 201 that is a receiving unit that receives data input from the outside, a processor 202 that is a CPU, a memory 203, and an output unit 204 that is a transmitting unit that transmits data to the outside. The input unit 201 is an interface circuit that receives data input from the outside of the control circuit 200 and supplies this input data to the processor 202. The output unit 204 is an interface circuit that sends data from the processor 202 or the memory 203 to the outside of the control circuit 200. When the data generation unit 11 (when the unit 11 is the processing circuit for generating data), the processing circuit in the control-information receiving section 17, the encoding unit 13, and the modulation unit 14 are implemented by the control circuit 200 illustrated in FIG. 3, they are implemented by the processor 202 reading and executing a program stored in the memory 203 and corresponding to individual processing of each part. The memory 203 is also used as temporary memory in individual processing executed by the processor 202.

Next, an operation at the transmitting station 1 in the present embodiment will be described. The data generation unit 11 of the transmitting station 1 generates data and stores the data in the transmission buffer 12. The transmission buffer 12 outputs to the encoder 13 data in an amount of transfer specified by the control-information receiving section 17 at a time specified by the control-information receiving section 17. The specified time is, for example, a time when the elevation angle between the transmitting station 1 and a receiving station 2 to which data is transmitted becomes a predetermined angle or more. The specified time may be notified by the control station 4, or may be calculated by the control unit 171 on the basis of the location of the receiving station 2 and the location of the control unit 171 itself, that is, the location of the satellite in which the transmitting station 1 is mounted. In the latter case, the location of a receiving station 2 to which data is transmitted is notified by the control station 4. For the locations of the receiving stations 2, the locations of the receiving stations 2 and identification information on the receiving stations 2 may be associated and stored in advance in internal or external memory of the controller 171 so that the identification information on the receiving stations is notified by the control station 4. For its own location of the control unit 171, the satellite generally has a function of calculating its own location, and can use a location calculated by the function. Specifically, for example, as described in "G. Marl et al., 'Satellite Communications Systems Third edition,' pp. 268 to 269, John Wiley & Sons, Inc.," an elevation angle E can be calculated by the following formula (1).

$$E = \arccos[(r/R)\sin \varphi] \ldots \quad (1)$$

E: elevation angle
r: distance from earth center to satellite (earth radius+ satellite altitude)
R: distance from ground station to satellite
$\varphi$: angle formed by SOS where O is earth center, P is ground station, and S is satellite The specified amount of transfer is calculated by the control unit 171 on the basis of an encoding scheme and a modulation scheme notified by the control station 4.

The encoding unit 13 encodes data output from the transmission buffer 12 by an encoding scheme specified by the controller 171 of the control-information receiving section 17. The encoding scheme includes an encoding type, a code rate, and a puncture pattern, that is, a rule of bits to be removed from a data string. The encoding type indicates a code type used such as a convolution code or an LDPC code. The encoding scheme may be notified by the control station 4, or the encoding scheme may be changed in a predetermined change pattern. For example, a plurality of encoding schemes is previously stored in the internal or external memory of the control unit 171, and the control unit 171 selects one of the plurality of encoding schemes according to a predetermined condition. For example, the control unit 171 may select an encoding scheme on the basis of its own location and the location of the receiving station 2. Specifically, for example, the control unit 171 selects the encoding scheme in accordance with an elevation angle between the receiving station 2 and the transmitting station 1. For example, when the elevation angle is smaller than or equal to a first value, a first encoding scheme is used. When the elevation angle is larger than the first value and smaller than or equal to a second value, a second encoding scheme is used. When the elevation angle is larger than the second value, a third encoding scheme is used. The second value is larger than the first value. The elevation angle can be calculated on the basis of its own location described above and the location of the receiving station 2. The encoding unit 13 may include information on data transmission specified by the control unit 171 of the control-information receiving section 17, that is, transmission control information indicating the encoding scheme, the modulation scheme, and others, into data to be transmitted to the receiving stations 2. This allows the receiving stations 2, when receiving the data from the transmitting station 1, to receive the transmission control information prior to the demodulation of the data, such that the receiving stations correctly demodulate and decode the data, even when the encoding scheme and the modulation scheme are changed by the hour.

The modulation unit 14 modulates the encoded data output from the encoder 13 by a modulation scheme specified by the control unit 171 of the control-information receiving section 17. Like the encoding scheme of the encoding unit 13 described above, the control station 4 may notify the modification scheme, or the controller 171 may change the modulation scheme in a predetermined change pattern.

Specifically, for example, the transmitting station 1 holds as a change pattern the correspondence between indices representing an encoding scheme and a modulation scheme according to reception-quality estimate values at each elevation angle of the transmitting station 1 at the receiving stations 2, and sets an encoding scheme and a modulation scheme on the basis of the elevation angle of the transmitting station 1 at the receiving stations 2 and the change pattern.

The radio transmitting unit 15 frequency-converts the data modulated by the modulator 14 to a frequency specified by the control unit 171 of the control-information receiving section 17, amplifies the frequency-converted data, and then transmits this amplified frequency-converted data as a radio signal through the transmitting antenna 16. Like the encoding scheme, the control station 4 may notify the frequency, or the control unit 171 may change the frequency in a predetermined change pattern.

The transmitting antenna 16 emits the signal input from the radio transmitting unit 15 as a radio signal in an irradiation direction, that is, an orientation direction specified by the control unit 171 of the control-information receiving section 17. Here, the irradiation direction of the transmitting antenna 16, that is, the beam central direction may be changed by mechanically changing the antenna direction. In a configuration in which a phased array antenna is used as the transmitting antenna 16 to form a desired beam by a plurality of radiation elements, a change in the beam central direction may be implemented by changing the phase and amplitude of each element.

Figure 4:
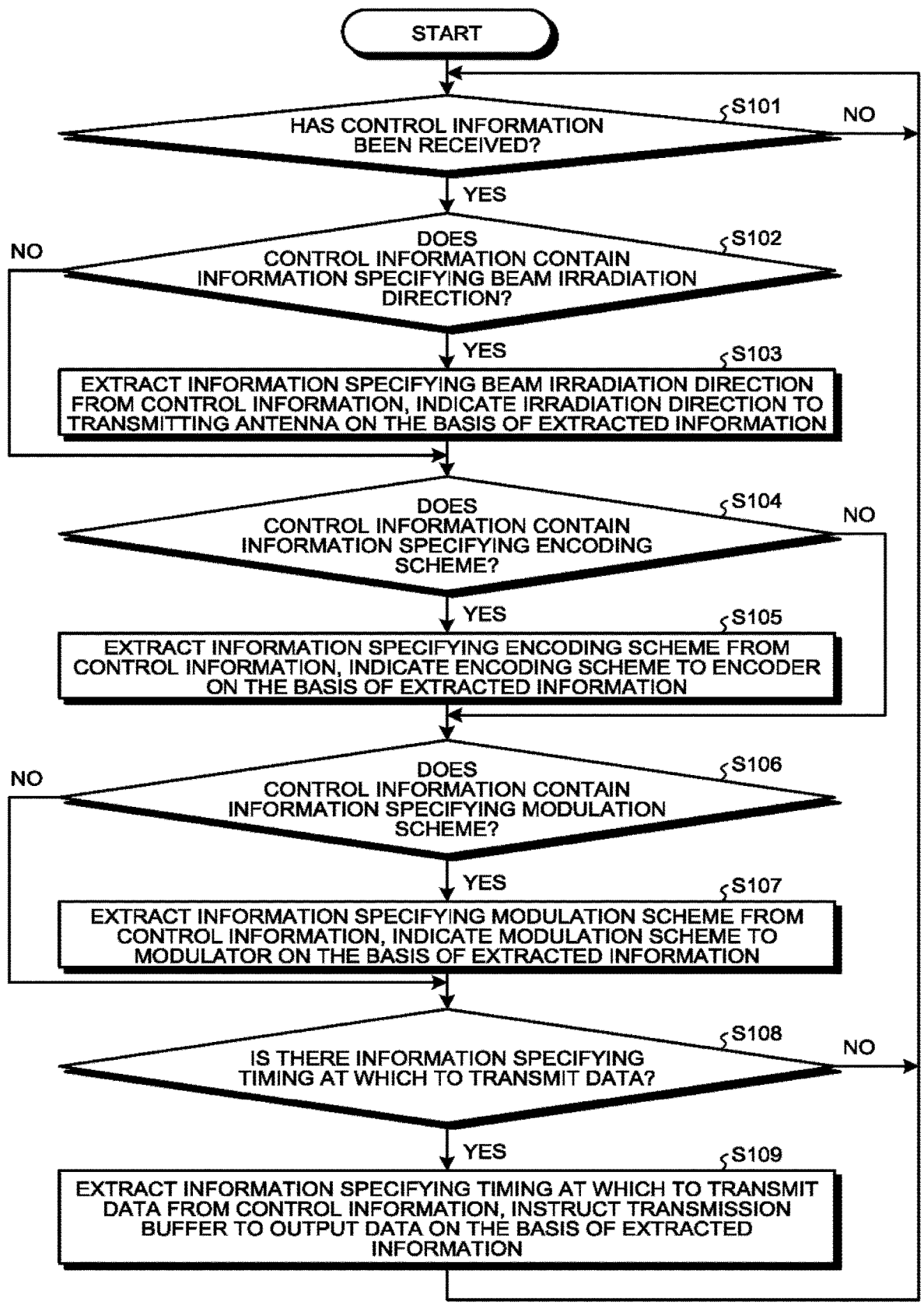
FIG. 4 is a flowchart illustrating an example of a control processing procedure of a control unit of the transmitting station in the first embodiment.

Next, the operation of the control unit 171 of the control-information receiving section 17 will be described. FIG. 4 is a flowchart illustrating an example of a control processing procedure of the control unit 171. FIG. 4 illustrates an example where the control station 4 notifies the encoding scheme, the modulation scheme, and a timing at which to transmit data. The control unit 171 determines whether the control unit 171 has received the control information, that is, whether the control information has been input from the receiving unit 172 or not (step S101). When the control unit 171 does not receive the control information (No in step S101), the control unit 171 repeats step S101. When the control unit 171 has received the control information (Yes in step S101), the control unit 171 determines whether the control information contains information specifying a beam irradiation direction or not (step S102). It is assumed that the control information transmitted from the control station 4 contains identification information indicating what type of information is contained, for example, and the the control unit 171 can grasp what information is contained on the basis of the identification information. When the control information contains information specifying the beam irradiation direction (Yes in step S102), the control unit 171 extracts the information specifying the beam irradiation direction from the control information, and indicates the irradiation direction to the transmitting antenna 16 on the basis of the extracted information (step S103).

The control unit 171 determines whether the control information contains information specifying an encoding scheme or not (step S104). When the control information contains the information specifying the encoding scheme (Yes in step S104), the control unit 171 extracts the information specifying the encoding scheme from the control information, and indicates to the encoding unit 13 the encoding scheme on the basis of the extracted information (step S105).

The control unit 171 also determines whether the control information contains information specifying a modulation scheme or not (step S106). When the control information contains the information specifying the modulation scheme (Yes in step S106), the control unit 171 extracts the information specifying the modulation scheme from the control information, and indicates to the modulation unit 14 the modulation scheme on the basis of the extracted information (step S107).

The control unit 171 also determines whether the control information contains information specifying a timing at which to transmit data or not (step S108). When the control information contains the information specifying the timing at which to transmit the data (Yes in step S108), the control unit 171 extracts the information specifying the timing at which to transmit the data from the control information, instructs the transmission buffer 12 to output data on the basis of the extracted information (step S109), and returns to step S101.

When the control information does not contain the information specifying the beam irradiation direction in step S102 (No in step S102), the control unit 171 proceeds to step S104. When the control information does not contain the information specifying the encoding scheme in step S104 (No in step S104), the control unit 171 proceeds to step S106. When the control information does not contain the information specifying the modulation scheme in step S106 (No in step S106), the control unit 171 proceeds to step S108. When the control information does not contain the information specifying the timing at which to transmit the data in step S108 (No in step S108), the control unit 171 returns to step S101.

The above procedure is an example. Step S102 and step S103, step S104 and step S105, step S106 and step S107, and step S108 and step S109 may be changed in order. Alternatively, step S102 and step S103, step S104 and step S105, step S106 and step S107, and step S106 and step S109 may be executed in parallel. Of the processing executed by the control-information receiving section 17, the control on the functional parts related to the data transmission method in the present embodiment has been described hereinabove. The control-information receiving section 17 may further execute processing other than the above-described processing. FIG. 4 illustrates an example where the control station 4 notifies the encoding scheme, the modulation scheme, and the timing at which to transmit the data. As described above, the control unit 171 may determine one or more of the encoding scheme, the modulation scheme, and the timing at which to transmit the data. When the control unit 171 determines one or more items of the encoding scheme, the modulation scheme, and the timing at which to transmit the data, the control unit 171 performs processing to determine each of the items by the above-described method in place of the processing corresponding to these items in the flowchart in FIG. 4. When the control station 4 notifies the frequency for frequency conversion at the radio transmitter 15, the control unit 171 extracts information specifying a frequency from the received control information, like the encoding scheme, modulation scheme, and timing at which to transmit the data in FIG. 4, and indicates to the radio transmitting unit 15 the frequency on the basis of the extracted information.

Figure 5:
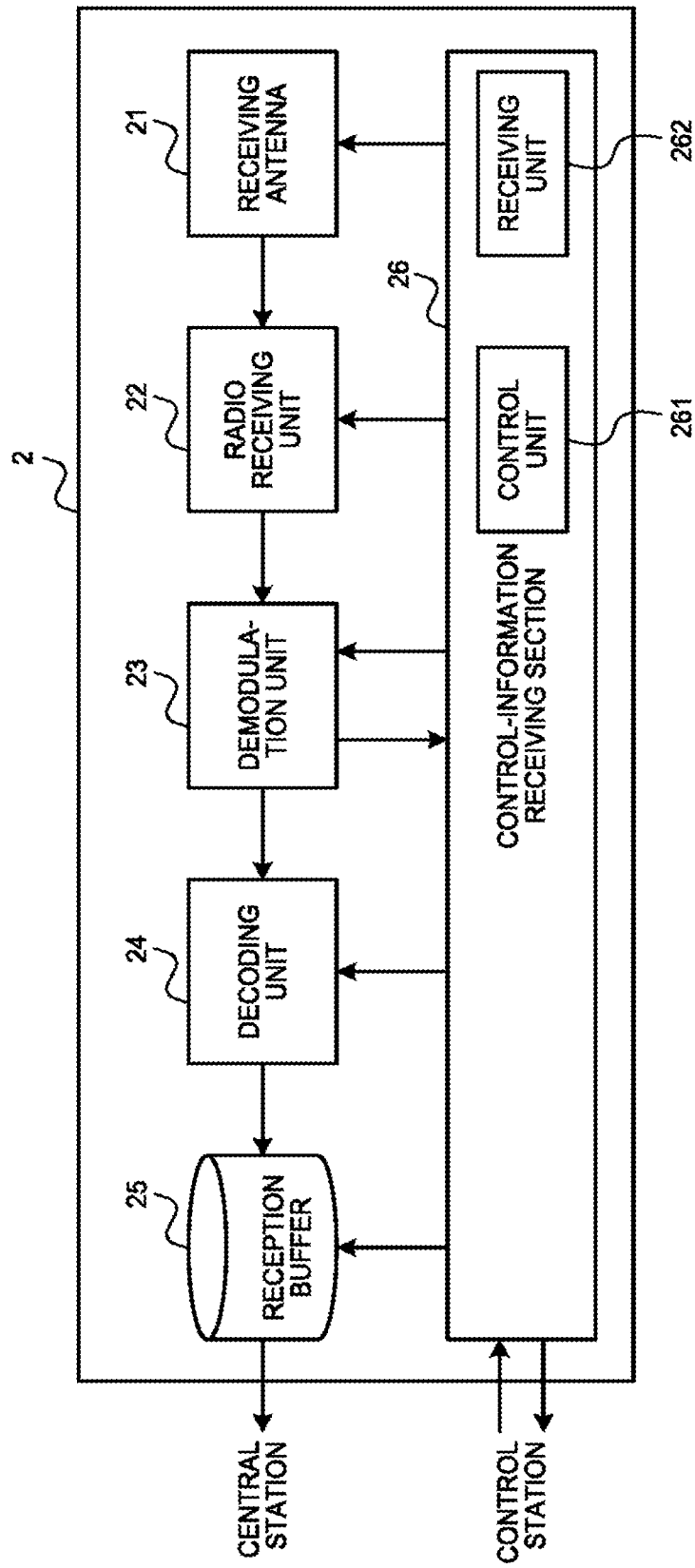
FIG. 5 is a diagram illustrating a configuration example of a receiving station in the first embodiment.

FIG. 5 is a diagram illustrating a configuration example of the receiving station 2 in the present embodiment. The receiving station 2 in the present embodiment includes a receiving antenna 21, a radio receiving unit 22, a demodulation unit 23, a decoding unit 24, a reception buffer 25, and a control-information receiving section 26. The receiving antenna 21 receives radio signals transmitted from the transmitting station 1. The radio receiving unit 22 converts a received radio signal into an electric signal and outputs this electric signal. The demodulation unit 23 demodulates the electric signal output from the radio receiving unit 22. The decoding unit 24 decodes the signal demodulated by the demodulation unit 23 and stores the decoded data in the reception buffer 25. The control-information receiving section 26 receives the control information from the control station 4, and controls the operations of parts constituting the receiving station 2. A receiving unit 262 of the control-information receiving section 26 receives the control information from the control station 4 and inputs the received control information to a control unit 261. The control unit 261 controls the operations of the respective parts of the receiving station 2 on the basis of the control information input from the receiving unit 262.

The parts illustrated in FIG. 5 can each be implemented as hardware such as an individual device or circuit. The radio receiving unit 22 is a receiver including an analog-to-digital converter circuit and others, the demodulation unit 23 is a demodulator or a modem, the decoding unit 24 is a decoder, the reception buffer 25 is a memory, the receiving unit 262 of the control-information receiving section 26 is a receiver, and the control unit 261 of the control-information receiving section 26 is a processing circuit for controlling the respective parts. The above respective parts may be configured as individual circuits or devices, or a plurality of functional parts may be configured as a single circuit or device.

The demodulation unit 23, the decoding unit 24, and the control unit 261 may be dedicated hardware, or may be a control circuit including a memory and a CPU that executes programs stored in the memory. When the demodulation unit 23, the decoding unit 24, and the control unit 261 are implemented as dedicated hardware, these are, for example, a single circuit, a combined circuit, a programmed processor, a parallel-programmed processor, an ASIC, an FPGA, or a combination thereof.

When the demodulation unit 23, the decoding unit 24, and the control unit 261 are implemented by a control circuit including a CPU, the control circuit is, for example, the control circuit 200 of the configuration illustrated in FIG. 3. When the demodulation unit 23, the decoding unit 24, and the control unit 261 are implemented by the control circuit 200 illustrated in FIG. 3, they are implemented by the processor 202 reading and executing the program stored in memory 203 and corresponding to individual processing of each part.

Next, the operation of the receiving station 2 will be described. The receiving antenna 21 of the receiving station 2 receives radio signals emitted by the transmitting antenna 16 of the transmitting station 1. The receiving antenna 21 has its changeable orientation direction, and is oriented in a direction specified by the control-information receiving section 26, that is, a direction in which the transmitting station 1 is located. An orientation direction of the receiving antenna 21 is notified by the control station 4. However, when the receiving station 2 is specified by the control station 4 as being a non-reception target, the control-information receiving section 26 may instruct the receiving antenna 21 to stop receiving signals from the transmitting station 1.

The radio receiving unit 22 converts a signal received by the receiving antenna 21 to a signal of frequency specified by the control-information receiving section 26, and subsequently converts the signal of this frequency into an electric signal and outputs this electrical signal. The demodulation unit 23 demodulates the electric signal output from the radio receiving unit 22 by a demodulation scheme specified by the control-information receiving section 26. The selection of the demodulation scheme is notified by the control station 4 such that the selected demodulation scheme corresponds to the modulation scheme used by the modulation unit 14 of the transmitting station 1, or the demodulation scheme is changed in a predetermined change pattern. When the demodulation scheme is changed in the predetermined change pattern, the change pattern should correspond to the predetermined change pattern set at the transmitting station 1. That is, the change pattern is set such that the moment when the transmitting station 1 changes the modulation scheme is the same as the moment when the receiving station 2 changes the demodulation scheme. When data transmitted by the transmitting station 1 contains transmission control information indicating the modulation scheme, the encoding scheme, and others, the transmission control information may be extracted from the electric signal to allow the demodulation to be performed by the demodulation scheme corresponding to the modulation scheme contained in the transmission control information. The demodulation unit 23 may measure the reception quality of a received signal that is an electric signal, as well as performing the demodulation. Specifically, for example, the demodulation unit 23 calculates a signal-to-interference and noise power ratio (SINR), using known data contained in a received signal. When the control station 4 is notified of the reception quality measured by the demodulation unit 23, the control station 4 can select the modulation scheme and the encoding scheme according to the most recent reception quality. The selection of the modulation scheme and the encoding scheme is described hereinafter.

The decoding unit 24 decodes the data demodulated by the demodulation unit 23, by the decoding scheme specified by the control-information receiving section 26 and stores the decoded data in the reception buffer 25 Like the demodulation scheme at the demodulation unit 23, the selection of the decoding scheme is specified by the control station 4, or the decoding scheme is changed in a predetermined change pattern, or the selection of the decoding scheme follows information contained in the transmission control information. The decoding scheme should be the decoding scheme corresponding to the encoding scheme at the transmitting station 1. Decoded data output by the decoding unit 24 may be a hard-decision value or a soft-decision value. The decoding unit 24 stores, in the reception buffer 25, a reception result indicating that the decoding is succeeded or failed together with the decoded data. The success or failure in the decoding can be determined, for example, by decoding a CRC (cyclic redundancy check) code as the encoding unit 13 of the transmitting station 1 performs the encoding that is not only error-correction coding with an LDPC or the like but also error-detection coding with the CRC or the like.

The reception buffer 25 holds the decoded data and the reception result received from the decoder 24, and outputs the held decoded data and reception result to the central station 3 at a desired timing. The central station 3 and the receiving stations 2-1 and 2-2 are connected by dedicated lines or the like, and the data can be output from the reception buffer 25 to the central station 3. The lines between the central station 3 and the receiving stations 2-1 and 2-2 are not limited to the dedicated lines, and may be a public network. For example, a best-effort-service public network may be used, or a virtual private network (VPN) may be established in the public network to use bandwidth-guaranteed communication.

Figure 6:
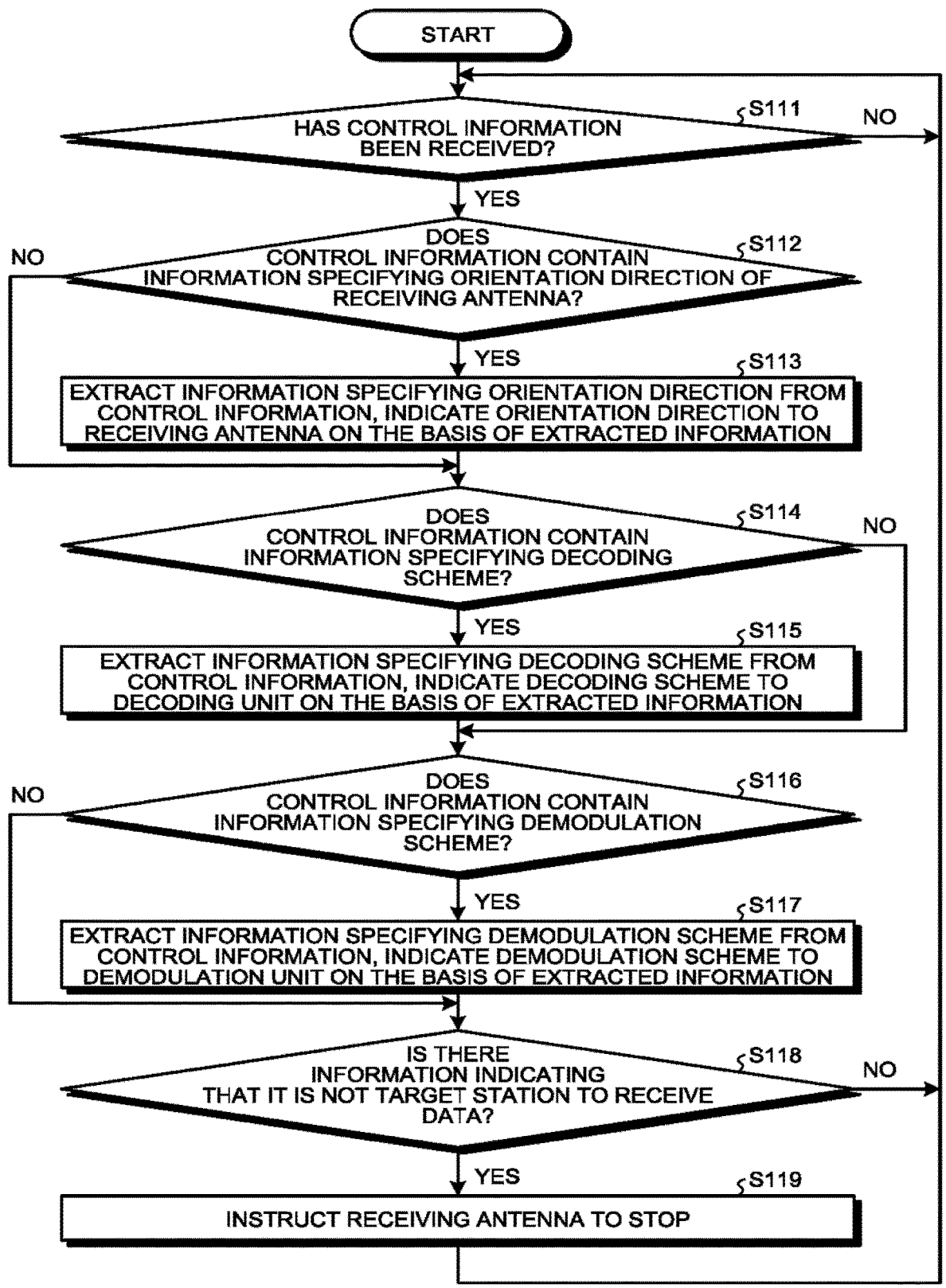
FIG. 6 is a flowchart illustrating an example of a control processing procedure of a control unit of the receiving station in the first embodiment.

Next, the operation of the control unit 261 of the control-information receiving section 26 will be described. FIG. 6 is a flowchart illustrating an example of a control processing procedure of the control unit 261. FIG. 6 illustrates an example where the control station 4 notifies an orientation direction of the receiving antenna, a decoding scheme, a demodulation scheme, and information indicating to the receiving station 2 whether the receiving station 2 is a reception target station or not. The control unit 261 determines whether the control unit 261 has received the control information, that is, whether the control information has been input from the receiving unit 262 or not (step S111). When the control unit 261 does not receive the control information (No in step S111), the control unit 261 repeats step S111. When the control unit 261 has received the control information (Yes in step S111), the control unit 261 determines whether the control information contains information specifying an orientation direction of the receiving antenna or not (step S112). When the control information contains the information specifying the orientation direction of the receiving antenna (Yes in step S112), the control unit 261 extracts the information specifying the orientation direction of the receiving antenna from the control information, and indicates to the receiving antenna 21 the orientation direction on the basis of the extracted information (step S113).

The control unit 261 determines whether the control information contains information specifying a decoding scheme or not (step S114). When the control information contains the information specifying the decoding scheme (Yes in step S114), the control unit 261 extracts the information specifying the decoding scheme from the control information, and indicates to the decoding unit 24 the decoding scheme on the basis of the extracted information (step S115).

The control unit 261 also determines whether the control information contains information specifying a demodulation scheme or not (step S116). When the control information contains the information specifying the demodulation scheme (Yes in step S116), the control unit 261 extracts the information specifying the demodulation scheme from the control information, and indicates to the demodulation unit 23 the demodulation scheme on the basis of the extracted information (step S117).

The control unit 261 also determines whether not the control information contains information indicating that its station is not a target station that receives data (step S118). When the control information contains the information indicating that its station is not the target station that receives the data (Yes in step S118), the control unit 261 instructs the receiving antenna 21 to stop reception (step S119), and returns to step S111.

When the control information does not contain the information specifying the orientation direction of the receiving antenna in step S112 (No in step S112), the control unit 261 proceeds to step S114. When the control information does not contain the information specifying the decoding scheme in step S114 (No in step S114), the control unit 261 proceeds to step S116. When the control information does not contain the information specifying the demodulation scheme in step S116 (No in step S116), the control unit 261 proceeds to step S118. When the control information does not contain the information indicating that its station is not the target station that receives the data in step S118 (No in step S118), the control unit 261 returns to step S111. The above-described procedure is an example. Like the control example illustrated in FIG. 4, the order of the steps may be changed, or the control unit 261 may determine one or more of the demodulation scheme, the decoding scheme, and others.

FIG. 7 is a diagram illustrating a configuration example of the central station 3 in the present embodiment. The central station 3 in the present embodiment includes reception buffers 31-1 to 31-n, a data selector 32, a data reproducer 33, and a control-information transmission-reception section 34. The reference character "n" is an integer greater than or equal to two. The reception buffers 31-1 to 31-n store the decoded data and the reception results output from the receiving stations 2-1 to 2-n, respectively. The data selector 32 manages duplication or missing of the data received from the receiving stations 2-1 to 2-n to output continuous received data for output to the data reproducer 33. The data reproducer 33 reproduces the data output from the data selector 32 as application data such as images. The control-information transmission-reception section 34 transmits and receives the control information to and from the control station 4, and controls the operation of the data selector 32. A transmission-reception unit 342 of the control-information transmission-reception section 34 receives the control information from the control station 4 and inputs the received control information to a control unit 341, and transmits control information generated by the control unit 341 to the control station 4. The control unit 341 grasps reception-target receiving stations 2 that are to be reception targets, on the basis of the control information input from the transmission-reception unit 342, and notifies the data selector 32 of the receiving stations 2 that are to be the reception targets. When the missing of data is detected by the data selector 32, the control unit 341 generates control information containing information indicating the missing data, and outputs the generated control information to the transmitter-receiver 342.

The parts illustrated in FIG. 7 can each be implemented as hardware such as an individual device or circuit. The reception buffers 31-1 to 31-n are memories, the data selector 32, the data reproducer 33, and the control unit 341 are processing circuits, and the transmission-reception unit 342 is a transmitter and a receiver. The above respective parts may be configured as individual circuits or devices, or a plurality of functional parts may be configured as a single circuit or device.

The data selector 32, the data reproducer 33, and the control unit 341 may be dedicated hardware, or may be a control circuit including a memory and a CPU that executes programs stored in the memory. When the data selector 32, the data reproducer 33, and the control unit 341 are implemented as the dedicated hardware, these are, for example, a single circuit, a combined circuit, a programmed processor, a parallel-programmed processor, an ASIC, an FPGA, or a combination thereof.

When the data selector 32, the data reproducer 33, and the control unit 341 are implemented by a control circuit including a CPU, the control circuit is, for example, the control circuit 200 of the configuration illustrated in FIG. 3. When the data selector 32, the data reproducer 33, and the control unit 341 are implemented by the control circuit 200 illustrated in FIG. 3, they are implemented by the processor 202 reading and executing the program stored in the memory 203 and corresponding to individual processing of each part.

Next, the operation of the central station 3 will be described. The reception buffers 31-1 to 31-n of the central station 3 store the decoded data and the reception results output from the receiving stations 2-1 to 2-n. The data selector 32 reads the decoded data held in the reception buffers 31-1 to 31-n, manages duplication and missing of the decoded data, and selectively reads the decoded data stored in the reception buffers 31-1 to 31-n to thereby provide a continuous data string. Here, it is assumed, for example, that data generated by the data generation unit 11 of the transmitting station 1 is framed, and the data generation unit 11 adds a sequence number to each frame. Further, it is assumed that the encoding unit 13 encodes data frame by frame, including a sequence number. In this case, decoded data is generated frame by frame, and each decoded piece of data contains a sequence number. In such a case, pieces of the decoded data stored in the reception buffers 31-1 to 31-n are arranged by the data selector 32 in the correct order on the basis of the sequence numbers. When the pieces of decoded data are duplicates, that is, when there is a plurality of pieces of decoded data of the same sequence number, all the pieces of decoded data can be recognized as the same data if it has been determined from the reception results that all of the pieces of the decoded data are correctly decoded. Thu any one of the pieces of data can be selected by a desired method. In this case, on the basis of the receiving stations 2 that are to be the reception targets notified by the control unit 341, the data selector 32 may select data from the decoded data stored in the reception buffers 31-1 to corresponding to the receiving stations 2 that are the reception targets.

If the data selector 32 discards the decoded data that has not been received correctly using the above-described reception results, the data selector 32 does not use the decoded data of an incorrect sequence number, and thus can prevent its malfunctions. Further, the data selector 2 may perform the sorting of data in addition to the selection of data. For example, even when reversal of a data order occurs due to a router between each receiving station 2 and the central station, the data selector 32 performs the sorting of data in accordance with sequence numbers, thereby generating a continuous data string. When the data selector 32 detects the missing of data, it may notify the control unit 341 of the missing sequence number, and the control unit 341 may generate control information containing information indicating the missing sequence number and notify the generated control information to the control station 4 through the transmission-reception unit 342. In this case, the control station 4 can instruct the transmitting station 1 to retransmit the missing data. This can achieve highly reliable transmission. Further, if control unit 341 includes in control information, identification information on a receiving station 2 that is a source of decoded data corresponding to a missing sequence number, the control station 4 can detect reception failure for each receiving station 2. Thus, when the control station 4 is notified of the reception failure at a receiving station 2 a predetermined threshold number of times or more, the control station 4 can determine that the receiving station 2 is in an abnormal state, and remove this receiving station from reception target candidates.

When the decoding unit 24 of the receiving stations 2 output soft-decision values as decoded data, the data selector 32 can weight duplicate signals received from two receiving stations 2, by reliability information, and then perform vector synthesis, data determination, and decoding. For example, for signals received from two receiving stations, the two signals are weighted by a ratio in received signal quality and synthesized, so that the synthesized signal can have increased signal components of good received signal quality, that is, of high data reliability. In this case, as compared to the case where pieces of data from a plurality of receiving stations are synthesized by selecting one of pieces of data that are duplicates as described above, the reliability of received signals can be increased, and thus an error rate after decoding can be reduced.

The data reproducer 33 reproduces a continuous data string output from the data selector 32, into application data such as images.

FIG. 8 is a diagram illustrating a configuration example of the control station 4 in the present embodiment. The control station 4 in the present embodiment includes a reception-quality estimating unit 41, a beam control unit 42, a code modulation control unit 43, a control-information transmission-reception section 44, and a location management unit 45.

The reception-quality estimating unit 41 estimates reception quality when the receiving station receives the signal transmitted by the transmitting station 1. Specifically, the reception-quality estimating unit 41 calculates a reception-quality estimate value that is an estimate value of received signal quality at the receiving station 2 that receives signals transmitted from the transmitting antenna 16 of the transmitting station 1. On the basis of the reception quality estimated by the reception-quality estimating unit 41, the beam control unit 42 selects: a beam irradiation direction of the transmitting station 1; and receiving stations 2 that are to be target stations that receive signals transmitted by the transmitting station 1. Specifically, the beam control unit 42 determines an orientation direction of the transmitting antenna 16 of the transmitting station 1, on the basis of reception-quality estimate values. The code modulation control unit 43 is a determiner that determines an encoding scheme and a modulation scheme to be used in communication between the transmitting station 1 and the receiving stations 2. The control-information transmission-reception section 44 transmits and receives control information to and from the transmitting station 1, the receiving stations 2, and the central station 3. A transmitting unit 442 of the control-information transmission-reception section 44 transmits control information as radio signals to the transmitting station 1. The location management unit 45 calculates the location of the satellite in which the transmitting station 1 is mounted. For a method of calculating the location of the satellite by the location management unit 45, any method may be used. For example, the location of the satellite is calculated by orbit determination and orbit propagation calculation.

A transmission-reception unit 443 of the control-information transmission-reception section 44 transmits and receives the control information to and from the receiving stations 2 and to and from the central station 3. The control unit 441 generates the control information containing the irradiation direction of the beam selected by the beam control unit 42 and an encoding scheme and a modulation scheme selected by the code modulation control unit 43, and outputs the generated control information to the transmitting unit 442. The control unit 441 also generates the control information to notify the receiving stations 2 of an encoding scheme and a modulation scheme selected by the code modulation control unit 43, and outputs the generated control information to the transmission-reception unit 443. Alternatively, the control unit 441 generates the control information to notify the receiving stations 2 of a decoding scheme and a demodulation scheme corresponding to the encoding scheme and the modulation scheme selected by the code modulation control unit 43, and outputs the generated control information to the transmission-reception unit 443. Herein described is an example where the control station 4 notifies the transmitting station 1 of the encoding scheme and the modulation scheme, and notifies the receiving stations 2 of the decoding scheme and the demodulation scheme, but this is not limiting. As described above, the transmitting station 1 may change the encoding scheme and the modulation scheme in a predetermined change pattern, and the receiving stations 2 may change the decoding scheme and the demodulation scheme in a predetermined change pattern. When the control unit 441 of the control-information transmission-reception section 44 receives the control information containing the information indicating missing data from the central station 3 through the transmission-reception unit 443, the control unit 441 generates control information for an instruction to retransmit the missing data and outputs the generated control information to the transmitting unit 442. The control unit 441 may generate control information containing information indicating receiving stations 2 that are to be target stations that receive signals transmitted by the transmitting station 1, and notify the central station 3 of the generated control information through the transmission-reception unit 443. When the receiving stations 2 measure and transmit the received signal quality as the control information, the control unit 441 notifies the reception-quality estimating unit 41 of the received signal quality contained in the control information received through the transmission-reception unit 443. Then, the reception-quality estimating unit 41 may correct the estimate values of the received signal quality, on the basis of the notified received signal quality. For example, when the difference between the notified received signal quality and the estimate value of the received signal quality is greater than or equal to a predetermined threshold, the average value of these two is set as a corrected received signal quality estimate value, which is close to an actual propagation path condition.

The parts illustrated in FIG. 8 can each be implemented as hardware such as an individual device or circuit. The reception-quality estimating unit 41, the beam control unit 42, the code modulation control unit 43, the location management unit 45, and the control unit 441 are processing circuits, the transmission-reception unit 443 is a transmitter and a receiver, and the transmitting unit 442 is a radio transmitter. The above respective parts may be configured as individual circuits or devices, or a plurality of functional parts may be configured as a single circuit or device.

The reception-quality estimating unit 41, the beam control unit 42, the code modulation control unit 43, the location management unit 45, and the control unit 441 may be dedicated hardware, or may be a control circuit including a memory and a CPU that executes programs stored in the memory. When the reception-quality estimating unit 41, the beam control unit 42, the code modulation control unit 43, the location management unit 45, and the control unit 441 are implemented as the dedicated hardware, these are, for example, a single circuit, a combined circuit, a programmed processor, a parallel-programmed processor, an ASIC, an FPGA, or a combination thereof.

When the reception-quality estimating unit 41, the beam control unit 42, the code modulation control unit 43, the location management unit 45, and the control unit 441 are implemented by a control circuit including a CPU, the control circuit is, for example, the control circuit 200 of the configuration illustrated in FIG. 3. When the reception-quality estimating unit 41, the beam control unit 42, the code modulation control unit 43, the location management unit 45, and the control unit 441 are implemented by the control circuit 200 illustrated in FIG. 3, they are implemented by the processor 202 reading and executing the program stored in the memory 203 and corresponding to individual processing of each part.

Site diversity in the data transmission system in the present embodiment will be described hereinbelow. The site diversity in the data transmission system in the present embodiment is a method for reducing the probability of occurrence of rain attenuation by using a plurality of receiving stations, as described in Non Patent Literature 1 described above. It is assumed that when the availability rate provided in performing the site diversity by using two receiving stations 2 is 90%, the availability rate at each receiving station 2 is 80%, for example. The availability rate indicates an hour rate at which the amount of rain attenuation is smaller than a threshold at the receiving station 2. For example, when the site diversity is performed using the two receiving stations 2 one of which is in rain and provides the amount of rain attenuation larger than or equal to the threshold, the effect of rain attenuation can be avoided by using data received at the other receiving station 2 if the other receiving station 2 is under the clear sky. Thus, the availability rate provided when the site diversity is performed is higher than the availability rate provided when a single receiving station is used.

Figure 9:
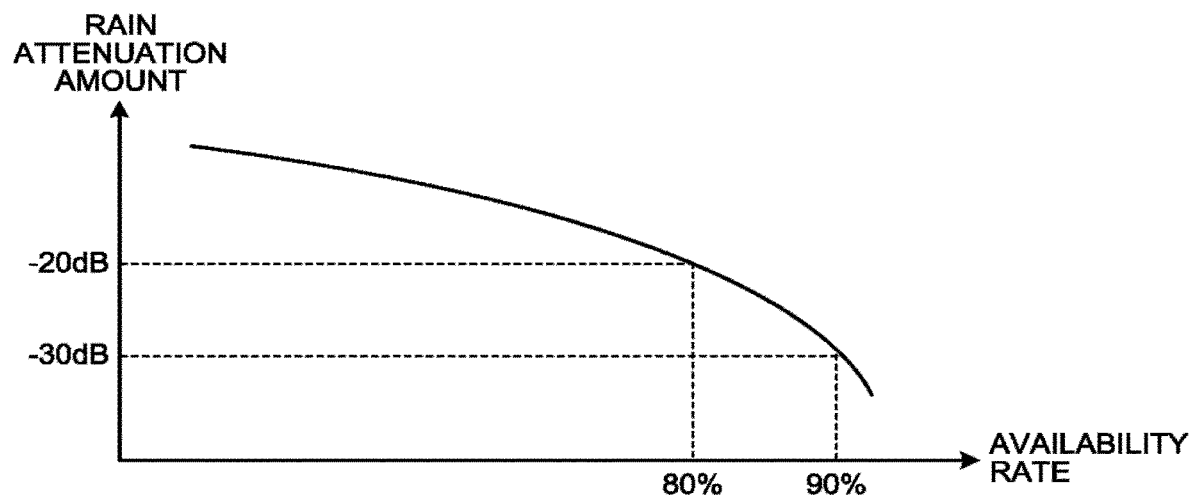
FIG. 9 is a graph schematically representing the relationship between an availability rate and a rain attenuation amount.

FIG. 9 is a graph schematically representing the relationship between the availability rate and the amount of rain attenuation. Numerical values in the figure show an example, and the actual availability rate and the actual amount of rain attenuation are not limited to the numerical values in the figure. According to FIG. 9, the amount of rain attenuation to be estimated in channel design at an availability rate of 80% is −20 dB. On the other hand, according to FIG. 9, the amount of rain attenuation to be estimated in channel design at an availability rate of 90% is −30 dB. That is, when the site diversity is performed, the amount of rain attenuation to be estimated can be reduced by 10 dB, as compared to the case where a single receiving station receives signals. This increases an estimate value of reception quality. Typically, the higher the estimate value of reception quality is, the higher the modulation level and the code rate can be set. Thus, when the site diversity is performed, the modulation level and the code rate can be set higher than when a single receiving station receives signals, thus improving the throughput.

On the other hand, when the frequency band for data transmission rises, the beam pattern of a beam formed by a transmitting antenna with the same antenna diameter becomes narrow in range. Thus, it is required to control the orientation direction of the beam such that the beam is emitted to a plurality of receiving stations performing site diversity. When the orbit of the satellite in which the transmitting station 1 is mounted is not a stationary orbit, the ground position of the sub-satellite point changes. In particular, when the transmitting station 1 is mounted in a polar orbiting satellite such as one in a synchronous sub-recurrent orbit, the latitude and longitude of the sub-satellite point orbit greatly change, and the elevation angle of the satellite as viewed from the ground stations greatly changes.

Figure 10:
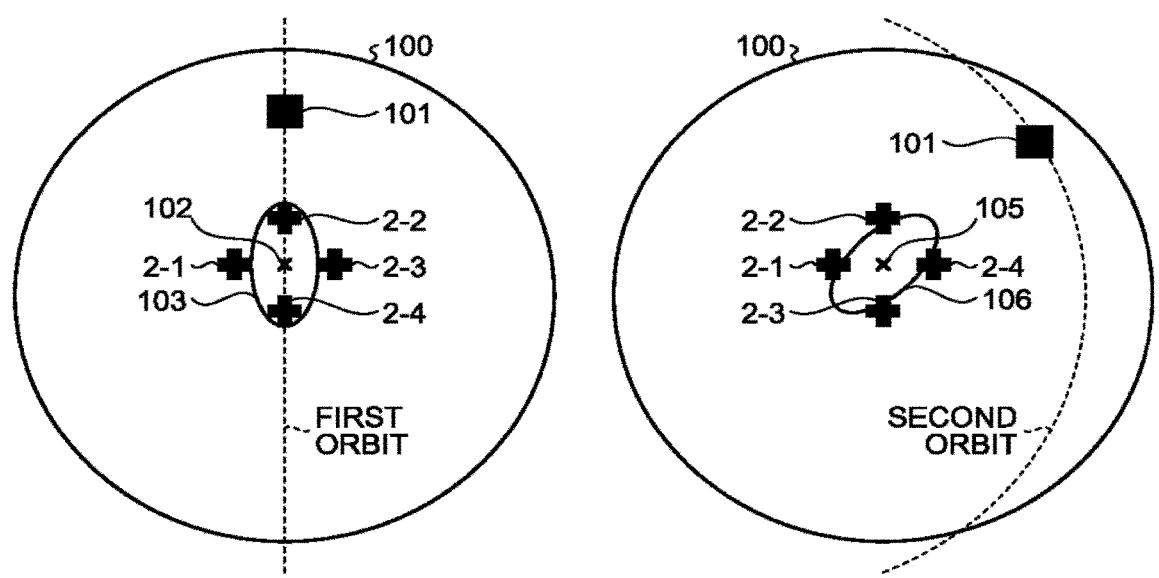
FIG. 10 is a diagram illustrating an example of a change in the footprint of a beam of the transmitting station mounted in a polar orbiting satellite.

FIG. 10 is a diagram illustrating an example of a change in the footprint of a beam of the transmitting station 1 mounted in a polar orbiting satellite such as one in a synchronous sub-recurrent orbit. The left side in FIG. 10 illustrates a center 102 of a beam and a footprint 103, the beam being formed by the transmitting antenna 16 when a satellite 101 in which the transmitting station 1 is mounted passes along a first orbit. In the example in FIG. 10, four receiving stations 2-1 to 2-4 installed on the Earth 100 are illustrated. The right side in FIG. 10 illustrates a center 105 of a beam and a footprint 106, the beam being formed by the transmitting antenna 16 when the satellite 101 in which the transmitting station 1 is mounted passes along a second orbit. The first orbit and the second orbit show orbits at different times when the same satellite circles in a synchronous sub-recurrent orbit or the like. As illustrated in FIG. 10, even when the orientation direction of the beam from the transmitting antenna 16 of the transmitting station 1 is once set such that the beam is emitted to the receiving stations 2-2 and 2-4 performing the site diversity in a state illustrated on the left side of FIG. 10, there is a possibility that the beam is not properly emitted to the two receiving stations performing the site diversity, as illustrated on the right side of FIG. 10, due to changes in the latitude and longitude of the sub-satellite point and a change in the elevation angle of the satellite as viewed from the ground stations described above.

Thus, in the present embodiment, the control station 4 estimates the received signal quality at the receiving stations 2. On the basis of the estimated received signal quality, the control station 4 selects the receiving stations 2 that are to be the reception target stations, and selects the beam irradiation direction. As a result, the received signal quality at a plurality of the receiving stations performing the site diversity can be maintained at a desired value or more, thus improving throughput.

Next, the operation of the control station 4 in the present embodiment will be described. Hereinafter, described is an example where the control station 4 determines a beam irradiation direction, that is, a beam orientation direction of the transmitting station 1, a combination of the receiving stations 2 that receive radio signals transmitted from the transmitting station 1 and perform the site diversity, a modulation scheme, an encoding scheme, and others.

Figure 11:
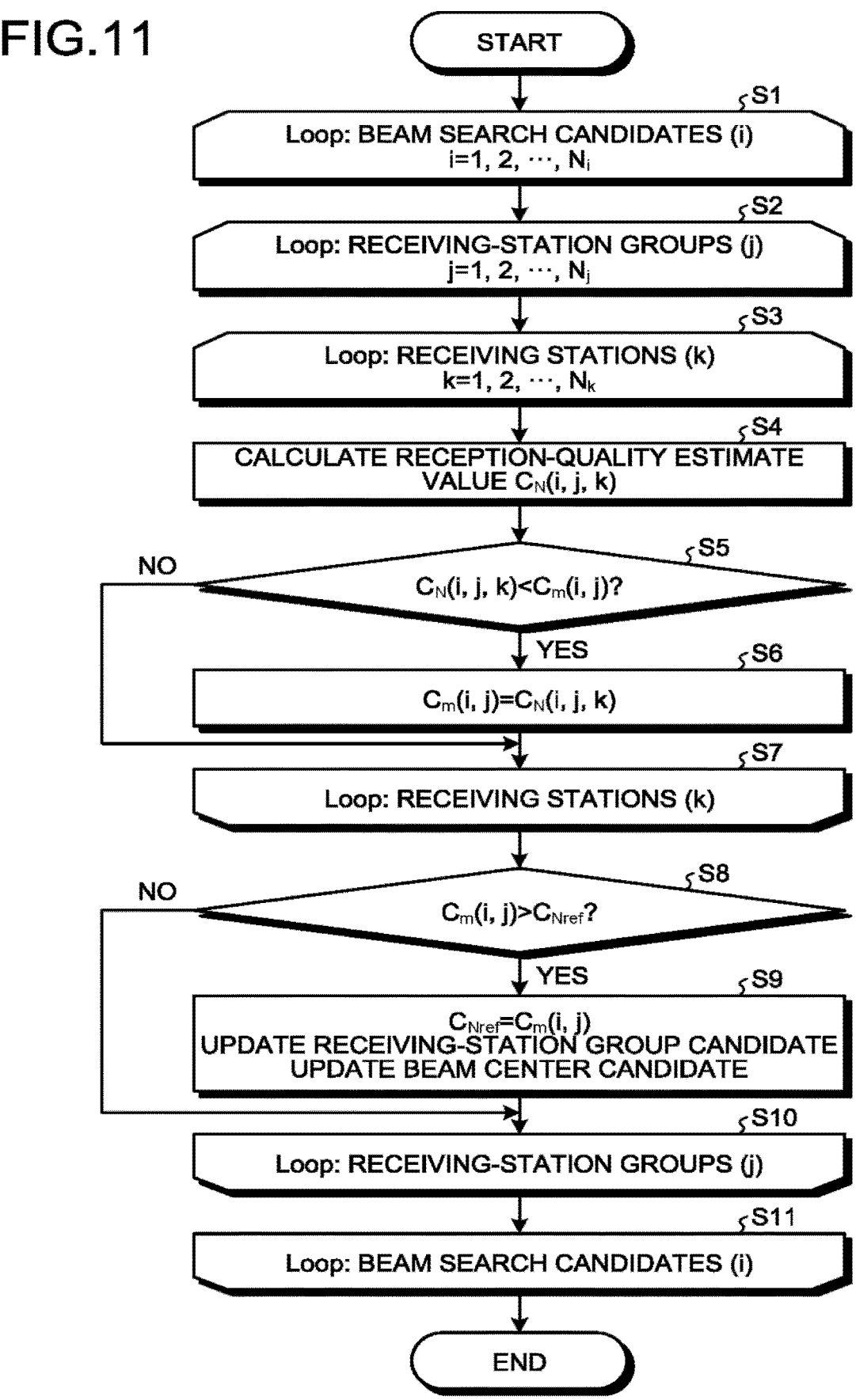
FIG. 11 is a flowchart illustrating an example of a beam determination processing procedure at a beam control unit in the first embodiment.

FIG. 11 is a flowchart illustrating an example of a beam determination processing procedure at the beam control unit 42. As illustrated in FIG. 11, first, the beam control unit 42 starts a loop for all beam search candidates (step S1). In this loop, where i is a variable used for identifying a beam search candidate, i=1, 2, . . . , $N_1$ is a condition of the loop. $N_1$ is the total number of beam search candidates, and can be set to a desired value. Here, the beam search candidates are defined as points of the center of a beam of the transmitting antenna 16 of the transmitting station 1 that are projected onto the ground surface, and these projected points are expressed by, for example, latitude and longitude. A point of the center of a beam of the transmitting antenna 16 of the transmitting station 1, which is projected onto the ground surface and expressed by latitude and longitude, is hereinafter referred to as beam center coordinates. Each beam center coordinate candidate is associated with i. For example, when the search range of beam center coordinates is set to 10 degrees at both latitude and longitude, and the beam center coordinate candidates are set in 0.1 degree, the number of beam center coordinate candidates amounts to ten thousand. In this case, the total number of the beam search candidates, that is, the total number $N_i$ of the beam center coordinate candidates is 10000, and the condition of the loop started in step S1 is i=1, 2, . . . , 10000.

Next, the beam control unit 42 starts a loop for receiving station groups (step S2). In this loop, where j is a variable used for identifying a receiving-station group, j=1, 2, . . . , $N_j$ is a condition of the loop. $N_j$ is the total number of the receiving-station groups. Here, the receiving-station group means a group of receiving stations 2 that receive the same data from the transmitting station 1 at the same time. For example, the receiving-station group is a group of receiving stations 2 that receive the same data from the transmitting station 1 at the same time for the site diversity. In the present embodiment, described is an example of determining the group of receiving stations 2 that receive the same data from the transmitting station 1 at the same time for the site diversity. However, the purpose of using the group of receiving stations 2 that receive the same data from the transmitting station 1 at the same time is not limited to the site diversity. The correspondence between "j" that is a variable representing a receiving-station group, and the receiving stations 2 is predetermined and held in internal or external memory of the beam control unit 42 using a table or the like. The numbers of receiving-station groups and the identification information on the receiving stations 2 are associated in such a manner that, for example, the first (j=1) receiving-station group corresponds to the receiving station 2-1 and the receiving station 2-2, and the second (j=2) receiving-station group corresponds to the receiving station 2-1 and the receiving station 2-3.

The maximum value $N_j$ of j can be expressed by the following formula (2) where n is the number of the receiving stations 2, and C represents a combination. In the following formula (2), when the desired reception quality can be ensured by a single receiving station 2, the single receiving station 2 may constitute the receiving-station group. When the number of the receiving stations constituting the receiving-station group is set to two or more, the last term on the right side of the following formula (2) should be deleted. When the upper limit of the number of the receiving stations 2 constituting the receiving-station group is specified, the upper limit value of the number of the receiving stations 2 can be used as the number of the receiving stations 2 in the following formula (2) in place of "n".

$$N_j = {}_nC_n + {}_nC_{n-1} + \ldots {}_nC_1 \qquad (2)$$

Next, the beam control unit 42 starts a loop for the receiving stations 2 (step S3). In this loop, where k is a variable used for identifying the receiving station 2, k=1, 2, . . . , $N_k$ is a condition of the loop. $N_k$ is the total number of the receiving stations 2 in the receiving-station group. The reference character "k" is assigned in descending order of numbers in such a manner that, for example, the receiving station 2 with the lowest identification information in the receiving-station group is set to k=1, and one with the second lowest identification information is set to k=2. For example, when j=1 and the first receiving-station group is formed of the receiving station 2-1 and the receiving station 2-2, and the pieces of identification information on the receiving station 2-1 and the receiving station 2-2 "2-1" and "2-2", respectively, the receiving station 2-1 corresponds to k=1, and the receiving station 2-2 corresponds to k=2. When j=2 and the second receiving-station group is formed of the receiving station 2-1 and the receiving station 2-3, and the pieces of identification information on the receiving station 2-1 and the receiving station 2-3 are "2-1" and "2-3", respectively, the receiving station 2-1 corresponds to k=1, and the receiving station 2-3 corresponds to k=2.

Next, the beam control unit 42 indicates i, j, and k to the reception-quality estimating unit 41, and instructs the reception-quality estimating unit 41 to calculate a reception-quality estimate value $C_N(i, j, k)$ (step S4). The reception-quality estimating unit 41 calculates the reception-quality estimate value $C_N(i, j, k)$, and notifies the reception-quality estimate value $C_N(i, j, k)$ to the beam control unit 42. $C_N(i, j, k)$ represents the reception-quality estimate value at the kth receiving station 2 in the jth receiving-station group when the ith beam search candidate is selected and the jth receiving-station group is selected. A method of calculating the reception-quality estimate value will be described later.

Next, the beam control unit 42 determines whether $C_N(i, j, k)$ is smaller than $C_m(i, j)$ or not (step S5). $C_m(i, j)$ is a value that is a minimum reception-quality estimate value when the ith beam search candidate is selected and the jth receiving-station group is selected. The initial value of $C_m(i, j)$ is set at a value larger than an expected minimum reception-quality estimate value. For example, the initial value of $C_m(i, j)$ is set to a value larger than the average value of expected reception-quality estimate values. When $C_N(i, j, k)$ is smaller than $C_m(i, j)$ (Yes in step S5), the beam control unit 42 sets $C_m(i, j) = C_N(i, j, k)$ (step S6), and proceeds to step S7. When $C_N(i, j, k)$ is not smaller than $C_m(i, j)$ (No in step S5), the beam control unit 42 proceeds to step S7.

When the beam control unit 42 completes a loop for the receiving stations (step S7), the beam control unit 42 determines whether the minimum received signal quality $C_m(i, j)$ provided when the ith beam search candidate is selected and the jth receiving-station group is selected is larger than $C_{Nref}$ or not (step S8). $C_{Nref}$ represents a calculated maximum reception-quality estimate value within combinations of i and j, and the initial value is set to a value smaller than an expected maximum reception-quality estimate value. When $C_m(i, j)$ is larger than $C_{Nref}$ (Yes in step S8), the beam control unit 42 sets $C_{Nref} = C_m(i, j)$, such that the receiving-station group candidate that is to be selected is updated to be "j", and the beam center candidate that is to be selected is updated to be "i" (step S9). Then, the beam control unit 42 completes a loop for the receiving-station group (step S10), and then completes a loop for the beam search candidates (step S11), thereby completing the processing. When $C_m(i, j)$ is not greater than $C_{Nref}$ in step S8 (No in step S8), the beam control unit 42 proceeds to step S10.

Among all the receiving-station groups and the beam center candidates, the receiving-station group and the beam center candidate having the largest one of the minimum values of the reception-quality estimate values of the receiving stations 2 constituting all the receiving-station groups are selected at the point of time the above processing is completed.

As above, the beam control unit 42 calculates the minimum value of the reception-quality estimate values at the receiving stations 2 belonging to the receiving-station group for each combination of the candidate for the orientation direction of the transmitting antenna 16 and the candidate for the receiving-station group that is the group of the receiving stations 2 that simultaneously receive data front the transmitting antenna 16. Then, the beam control unit 42 selects the combination of the candidate for the receiving-station group and the candidate for the orientation direction of the transmitting antenna of the largest one of the minimum values, and sets the selected candidate for the orientation direction of the transmitting antenna 16 as the orientation direction of the transmitting antenna.

Figure 12:
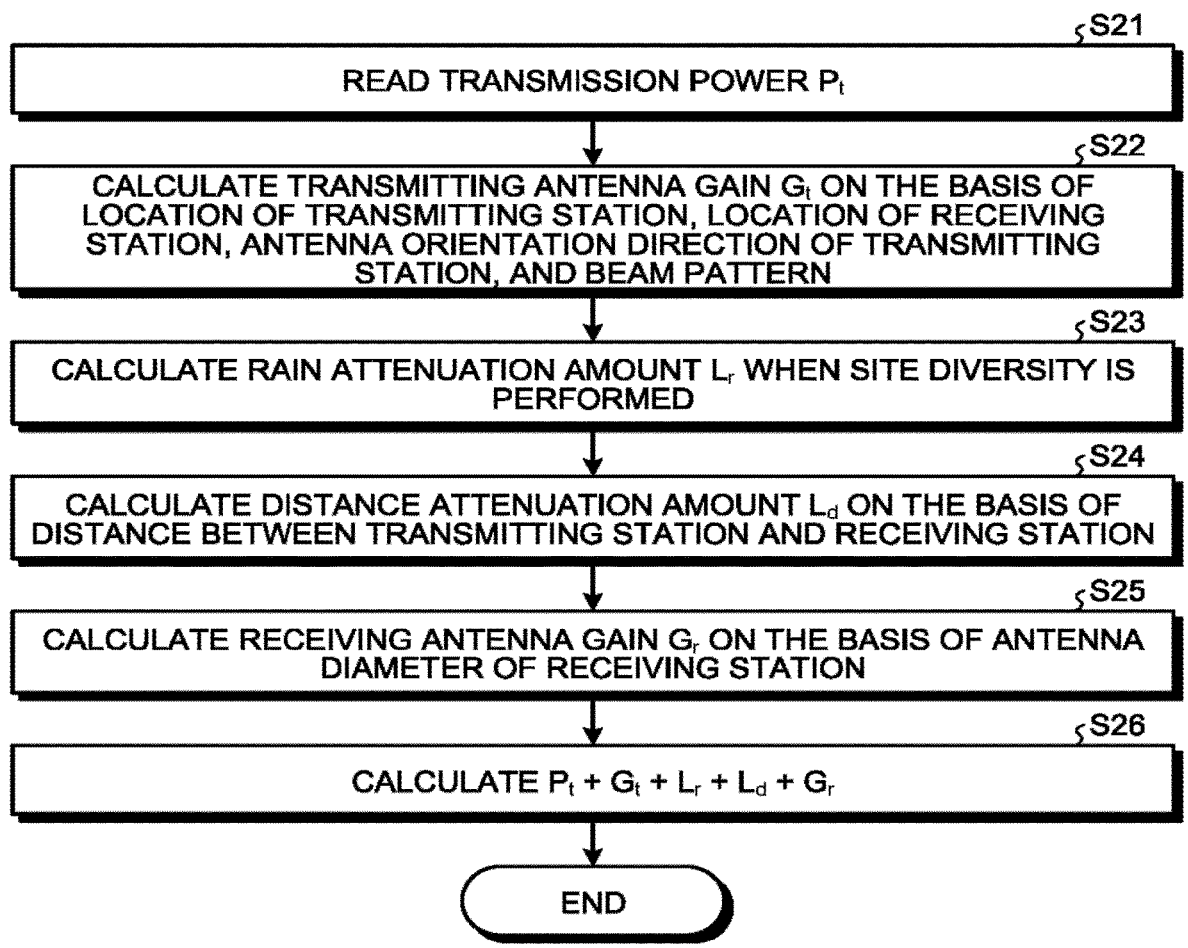
FIG. 12 is a flowchart illustrating an example of a processing procedure of calculating a reception-quality estimate value in the first embodiment.

Next, the calculation of the reception-quality estimate value in step S4 will be described. FIG. 12 is a flowchart illustrating an example of a processing procedure of calculating the reception-quality estimate value in the present embodiment. FIG. 12 is an example, and the procedure of calculating the reception quality estimate value is not limited to the example in FIG. 12. As illustrated in FIG. 12, the reception-quality estimating unit 41 reads a transmission power $P_t$ of the transmitting station 1 previously stored in the internal or external memory of the reception-quality estimating unit 41 (step S21). The transmitting station 1 may be configured such that the transmission power $P_t$ can be changed.

Figure 13:
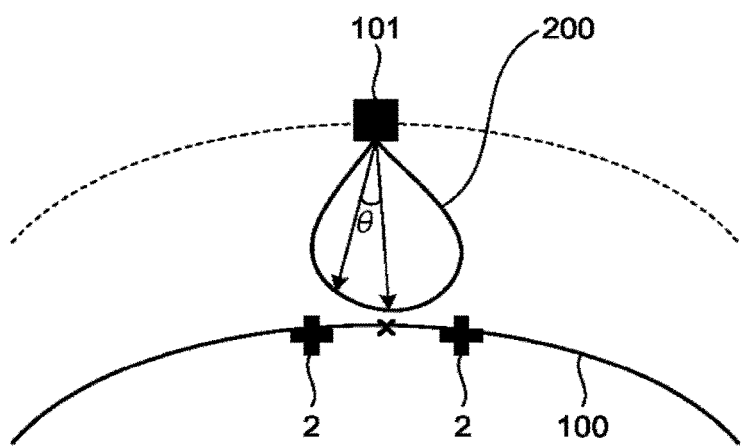
FIG. 13 is a diagram for explaining an angle θ between a beam center and a vector directed from the transmitting station toward the receiving station.

Next, the reception-quality estimating unit 41 calculates a transmitting antenna gain $G_t$ of the transmitting station 1, on the basis of the location of the transmitting station 1, the location of the receiving station 2, the antenna orientation direction of the transmitting station 1 corresponding to the ith beam search candidate, and a beam pattern of the transmitting station 1 (step S22). Specifically, for example, the reception-quality estimating unit 41 calculates the transmitting antenna gain $G_t$ as follows. Here, the beam pattern represents the transmitting antenna gain according to an angle from the center of the beam. The beam pattern is previously held in the internal or external memory of the beam control unit 42. The reception-quality estimating unit 41 acquires the location of the transmitting station 1 from the location management unit 45. The location of the receiving station 2 is previously stored in the internal or external memory of the reception-quality estimating unit 41. Then, the reception-quality estimating unit 41 calculates the angle θ between the beam center and a vector directed from the transmitting station 1 toward the receiving station 2 when the orientation direction of the transmitting antenna 16 is set such that the direction from the location of the transmitting station 1 to the beam center coordinates corresponding to the beam search candidate is the beam center. FIG. 13 is a diagram for explaining the angle θ between the beam center and the vector directed from the transmitting station 1 toward the receiving station 2. FIG. 13 schematically describes a beam pattern 200 with the transmitting station 1 at the center. It is noted that the beam pattern 200 does not represent an emitted beam itself. The reception-quality estimating unit 41 calculates the transmitting antenna gain $G_t$ corresponding to "θ", using the beam pattern.

Next, the reception-quality estimating unit 41 calculates the amount of rain attenuation $L_r$ when the receiving station 2 belonging to the jth receiving-station group performs the site diversity (step S23). Here, the amount of rain attenuation is calculated on the assumption that the receiving station 2 belonging to the jth receiving-station group performs the site diversity. The reception-quality estimating unit 41 calculates the amount of rain attenuation, for example, the amount of rain attenuation L, provided when the site diversity is performed. As described in, for example, Non Patent Literature 1, the reception-quality estimating unit 41 calculates a joint rain attenuation amount estimate value when the site diversity is performed, from a target availability rate and the probability that all the receiving stations 2 performing the site diversity have a desired amount of rain attenuation or more simultaneously. Then, the amount of rain attenuation at the single receiving station corresponding to the joint rain attenuation amount estimate value is designated at reference character $L_r$. That is, "$L_r$" can be defined as the amount of rain attenuation at the single receiving station corresponding to the joint rain attenuation amount estimate value that is calculated from the target availability rate and the probability that one or more receiving stations simultaneously receiving the data transmitted from the transmitting station 1 simultaneously have the desired amount of rain attenuation or more. When the site diversity is not applied, it is only necessary to calculate the amount of rain attenuation at the single receiving station 2.

Next, the reception-quality estimating unit 41 calculates the amount of distance attenuation $L_d$ on the basis of the distance between the transmitting station 1 and the receiving station 2 (step S24). The distance between the transmitting station 1 and the receiving station 2 can be calculated on the basis of the location of the transmitting station 1 and the location of the receiving station 2 described above. For example, the reception-quality estimating unit 41 determines the amount of distance attenuation $L_d$ as a free space propagation loss However, when there is an obstacle on a straight line between the transmitting station 1 and the receiving station 2, for example, when the receiving station 2 is disposed on a mountain or the like, a loss due to the obstacle is taken into consideration.

Next, the reception-quality estimating unit 41 calculates the receiving antenna gain $G_r$ on the basis of the antenna diameter of the receiving station 2 (step S25). It is assumed that the antenna diameters of the individual receiving stations 2 are stored in the internal or external memory of the reception-quality estimating unit 41. For example, for a specific method of calculating the receiving antenna gain $G_r$, any method may be used. For example, as described in "G. Marl et al., 'Satellite Communications Systems Third edition,' p. 495, John Wiley & Sons, Inc.," a maximum value of the receiving antenna gain can be calculated by the following formula (3).

$$G = \eta(\pi D/\lambda)^2 \qquad (3)$$

G: maximum value of receiving antenna gain (gain at beam center)
η: antenna efficiency
D: antenna diameter
λ: wavelength (inverse of carrier frequency)

Unlike the above-described transmitting antenna gain, the receiving antenna 21 is always controlled to be oriented toward the transmitting station, so that the effect of gain reduction due to angular difference is smaller than that of the transmitting antenna 16. Thus it is only necessary to consider only a predetermined value such as a design error for the angle between the direction of the transmitting station 1 and the antenna center, that is, the beam center. Thus, the receiving antenna gain $G_r$ can be calculated on the basis of the maximum value G of the receiving antenna gain and a predetermined value described above.

Next, the reception-quality estimating unit 41 calculates $P_t+G_t+L_r+L_d+G_r$, defines the calculated value as the reception-quality estimate value (step S26), and completes the processing. In the above processing, the reception-quality estimating unit 41 calculates the reception-quality estimate value on the basis of all of the transmission power of the transmitting station, the transmitting antenna gain of the transmitting station 1, the receiving antenna gain of the receiving station 2, the amount of rain attenuation at the receiving station 2, and the distance attenuation at the receiving station. Not limited to this, the reception-quality estimating unit 41 may calculate the reception-quality estimate value on the basis of one or more of them.

Figure 14:
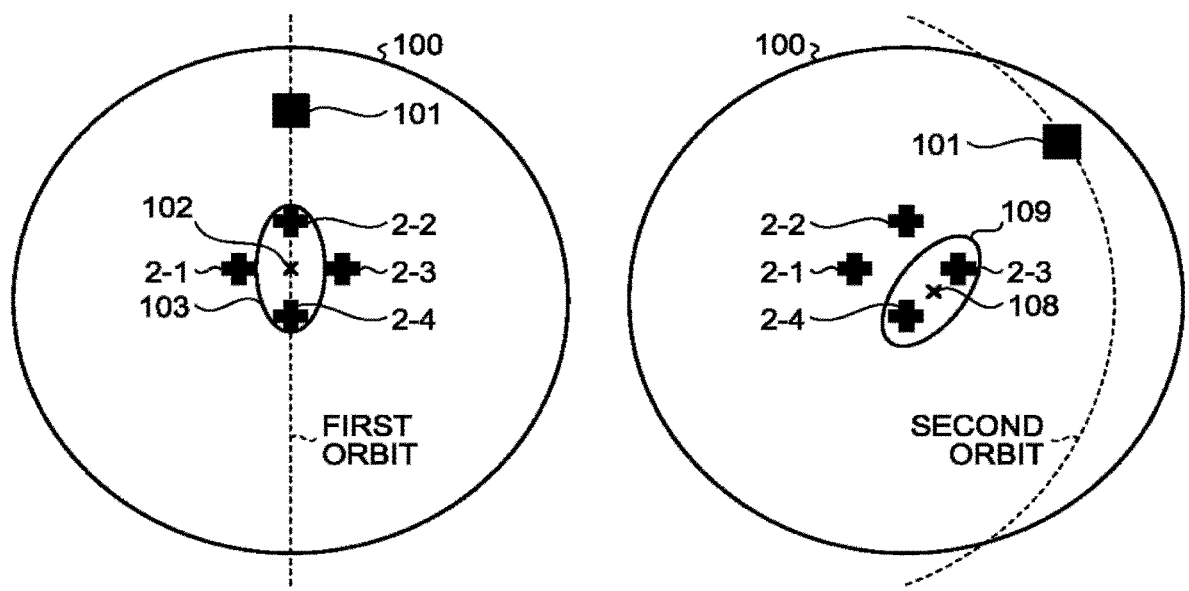
FIG. 14 is a diagram illustrating an example of the footprint of a beam when a receiving-station group and a beam center candidate are selected in the first embodiment.

When the receiving-station group and the beam center candidate are selected by the above-described method, the high received signal quality can be ensured even when the location of the satellite changes. FIG. 14 is a diagram illustrating an example of the footprint of a beam when the selection of the receiving-station group and the beam center candidate in the first embodiment is performed. A first orbit and a second orbit in FIG. 14 are identical to those in the example in FIG. 10. The left side in FIG. 14 illustrates the same state as that on the left side in FIG. 10. The right side in FIG. 14 illustrates an example where the satellite 101 in which the transmitting station 1 is mounted moves in the second orbit. In FIG. 14, a beam center 108 is located between the receiving station 2-3 and the receiving station 2-4, and a footprint 109 covers the receiving station 2-3 and the receiving station 2-4. Thus, in the present embodiment, the receiving stations 2 and a beam irradiation direction can be selected in correspondence to the location of the satellite, so that the high reception-quality estimate values can be maintained even when the location of the satellite changes.

When the demodulation unit 23 of the receiving station 2 measures the reception quality as described above, the control station 4 may receive the reception quality from the receiving station 2 to correct the reception-quality estimate value calculated by the above-described processing, using the received reception quality.

For each receiving station 2 belonging to the selected receiving-station group, the beam control unit 42 determines the orientation direction of the receiving antenna 21 of the receiving station 2. The orientation direction can be calculated on the basis of the location of the receiving station 2 and the location of the transmitting station 1. However, since the transmitting station 1 moves, the orientation direction may be determined by the hour. The beam control unit 42 notifies the control unit 441 of the determined orientation direction of the receiving antenna 21 of the receiving station 2 together with identification information on the receiving station 2. The control unit 441 includes in the control information the orientation direction of the receiving antenna 21 received from the beam control unit 42, and instructs the transmission-reception unit 443 to transmit the control information to the receiving station 2 that is the destination. The beam control unit 42 calculates the beam irradiation direction corresponding to the selected beam center candidate, on the basis of the result of the selection of the beam and the receiving-station group, and notifies the control unit 441 of the beam irradiation direction. The control unit 441 generates the control information containing the beam irradiation direction, and instructs the transmitting unit 442 to transmit the control information to the transmitting station 1. On the basis of the result of the selection of the beam and the receiving-station group, the beam control unit 42 instructs the control unit 441 to transmit to the receiving stations not belonging to the selected receiving-station group, the control information containing information indicating that these receiving stations are not the reception target stations. On the basis of the instruction, the control unit 441 generates the control information containing the information indicating those receiving stations are not the reception target stations, and instructs the transmission-reception unit 443 to transmit the control information to the receiving stations not belonging to the selected receiving-station group. On the basis of the result of the selection of the beam and the receiving-group, the beam control unit 42 notifies the code modulation control unit 43 of the receiving stations 2 belonging to the selected receiving-station group candidate.

The code modulation control unit 43 reads from the memory of the reception-quality estimating unit 41 the reception-quality estimate values associated with the receiving stations 2 notified by the beam control unit 42. It is noted that the reception-quality estimating unit 41 temporarily holds all the reception-quality estimate values calculated in step S4 in the internal memory, and at the completion of the processing illustrated in FIG. 11, the reception-quality estimating unit 41 holds in the internal memory the reception-quality estimate value of each receiving station in the receiving-station group corresponding to the receiving-station group and the beam center candidate that are selected finally. On the basis of the read reception-quality estimate values, the code modulation control unit 43 determines the encoding scheme and the modulation scheme to satisfy a desired error rate. Specifically, since a low reception-quality estimate value leads to a high error rate, when the reception-quality estimate values are low, the code modulation control unit 43 selects the encoding scheme of a low code rate, and selects the modulation scheme of a low modulation level. For example, the reception-quality estimate values are divided into a plurality of stages, a combination of the encoding scheme and the modulation scheme satisfying the desired error rate is predetermined for each stage, and the encoding scheme and the modulation scheme at each stage are held as a table. On the basis of the table and the read reception-quality estimate value, the code modulation control unit 43 selects the encoding scheme and the modulation scheme.

The code modulation control unit 43 notifies the control-information transmission-reception section 44 of the encoding scheme and the modulation scheme. The control-information transmission-reception section 44 generates the control information containing the encoding scheme and the modulation scheme, and notifies the transmitting station 1 and the receiving stations 2 of the generated control information. The encoding scheme and the modulation scheme may be notified by a single piece of the control information, or may be notified as different pieces of the control information containing the encoding scheme and the modulation scheme separately. The receiving stations 2 may be notified by the control information of the decoding scheme and the demodulation scheme corresponding to the encoding scheme and the modulation scheme, respectively, or may be notified of the encoding scheme and the modulation scheme.

This is because if the receiving stations 2 know the encoding scheme and the modulation scheme, the receiving stations 2 can select the decoding scheme and the demodulation scheme corresponding thereto. Here, for a method of notifying the encoding scheme and the modulation scheme, combinations of the encoding schemes and the modulation schemes may be held in a table, an index corresponding to a desired combination may be predetermined, and the control information containing the index may be notified. The above table may be one illustrated in Non Patent Literature 2, for example. For example, the encoding scheme and the modulation scheme are predetermined for each index value in such a manner that index #0 represents an $X_1$% code rate and QPSK modulation, and index #1 represents an $X_2$% code rate and 16QAM modulation.

Figure 15:
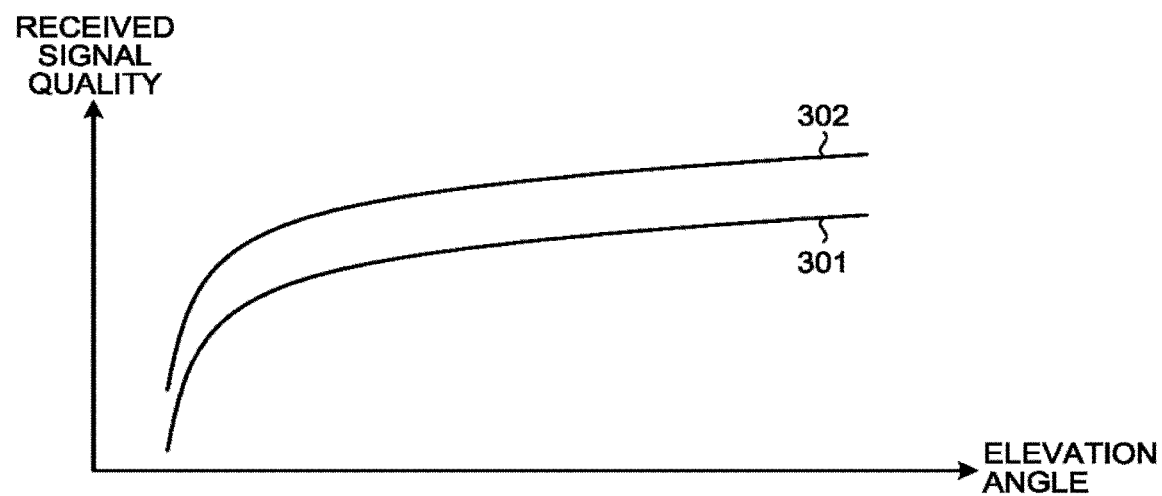
FIG. 15 is a graph illustrating an example of the relationship between an elevation angle and the reception-quality estimate value.
Figures 16, 17:
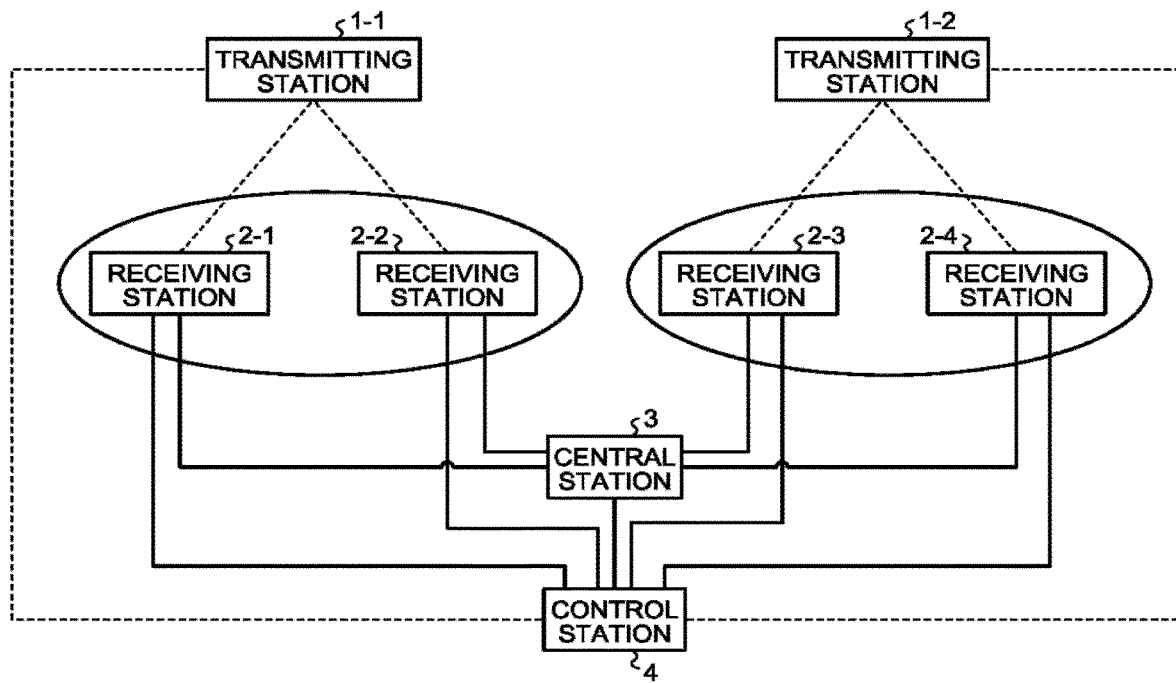
FIG. 16 is a diagram illustrating an example of a table of a change pattern of an encoding scheme and a modulation scheme according to the reception-quality estimate value at each elevation angle in the first embodiment.
FIG. 17 is a diagram illustrating a configuration example of a data transmission system according to a second embodiment.

When the reception-quality estimate value is uniquely determined by the elevation angle, the change pattern indicating the encoding scheme and the modulation scheme according to the reception-quality estimate value at each elevation angle may be determined, the transmitting station 1 and the receiving stations 2 may hold the change pattern, and the control station 4 may specify the change pattern so that the transmitting station 1 and the receiving stations 2 determine the encoding scheme and the modulation scheme in accordance with to the elevation angle. FIG. 15 is a graph illustrating an example of the relationship between the elevation angle and the reception-quality estimate value. In FIG. 15, a received-signal quality 301 represents the relationship between the elevation angle and the reception-quality estimate value in a first receiving-station group, and a received signal quality 302 represents the relationship between the elevation angle and the reception-quality estimate value in a second receiving-station group. As illustrated in FIG. 15, depending on the orbit of the satellite, the reception-quality estimate value is uniquely determined by the elevation angle. As illustrated in FIG. 15, this relationship can vary depending on the receiving-station group, that is, depending on the locations of ground stations constituting the receiving-station group. FIG. 16 is a diagram illustrating an example of a table of the change pattern of the encoding scheme and the modulation scheme according to the reception-quality estimate value at each elevation angle. As illustrated in FIG. 16, for example, two types of change patterns, a code modulation pattern #0 and a code modulation pattern #1, are determined for each elevation angle. The code modulation pattern #0 corresponds to the first receiving-station group illustrated in FIG. 15, and the code modulation pattern #1 corresponds to the second-receiving station group illustrated in FIG. 15. Each change pattern contains indices representing the encoding schemes and the modulation schemes according to the elevation angles. The control station 4 notifies information on which change pattern to use, in accordance with the selected receiving-station group. This allows the transmitting station 1 and the receiving stations 2 to determine the encoding scheme and the modulation scheme on the basis of the table and the notification of the information on which change pattern to use from the control station 4. This enables the encoding scheme and the modulation scheme, and the decoding scheme and the demodulation scheme to be notified reducing the amount of the transmission of the control information.

The shorter cycle of executing the above-described processing to determine the beam and the receiving-station group at the control station 4, that is, the processing to determine the orientation direction of the transmission antenna at the beam control unit 42 can more correctly reflect the received signal-quality and thus enables the fine-tuned control, but disadvantageously increases the amount of the control information. Thus, the above-described processing may be executed when the elevation angle between the transmitting station 1 and the receiving station 2 changes by a threshold or more, or may be executed every time the transmitting station 1 circles around the Earth.

When various parameters for the reception quality estimator 41 to derive the reception-quality estimate values are known before the data transmission system in the present embodiment starts operating, that is, before the communication is actually performed, the above-described processing to determine the beam and the receiving-station group at the control station 4 is computed in advance by computer simulation or the like, and the various types of information such as the beam orientation direction, the encoding scheme, and the modulation scheme for the transmitting station 1 and receiving stations 2 are set. This can reduce the amount of the control information during the period of operation.

Where the beam pattern is variable when the reception-quality estimating unit 41 calculates the transmitting antenna gain $G_t$, the transmitting antenna gain may be calculated for each of a plurality of beam pattern candidates. For example, an asymmetrical beam pattern such as an ellipse is included, the transmitting antenna gain $G_t$ is calculated for the beam patterns when the antenna is rotated. For a configuration in which a phase and an amplitude are changed like a phased array antenna, the phase and amplitude candidates may be determined for calculation for the beam pattern at that time. In the processing in FIG. 11, a loop for the beam patterns is added. When the beam pattern is changed as described above, the control station 4 can notify the transmitting station 1 of the beam pattern in addition to the beam irradiation direction.

As described above, in the data transmission system in which the transmitting station 1 transmits the data to the central station 3 through the receiving stations 2 in the present embodiment, the control station 4 selects receiving stations 2 that are to be the reception targets and the orientation direction of the beam that is to be emitted by the transmitting station 1, on the basis of the reception-quality estimate values at the receiving stations 2, and indicates the result of the selection to the transmitting station 1 and the receiving stations individually. Consequently, the data transmission system in the present embodiment can transmit the data with the high reception-quality, and can maintain the received signal quality at a plurality of the receiving stations at the desired value or more. When the encoding scheme and the modulation scheme for the data transmission are determined on the basis of the reception quality obtained from the above-described result of the selection, the increase in availability rate and the increase in data transmission speed can be simultaneously achieved.

Second Embodiment

FIG. 17 is a diagram illustrating a configuration example of a data transmission system according to a second embodiment of the present invention. The data transmission system in the present embodiment includes the transmitting stations 1-1 and 1-2, the receiving stations 2-1 to 2-4, the central station 3, and the control station 4. Although FIG. 17 illustrates only the four receiving stations, the number of the receiving stations is not limited to this. The configuration of the transmitting stations 1-1 and 1-2 is identical to that of the transmitting station 1 in the first embodiment. The configurations of the receiving stations 2, the central station 3, and the control station 4 are identical to those of the receiving stations 2, the central station 3, and the control station 4 in the first embodiment. In the present embodiment, operations at the reception-quality estimating unit 41 and the beam control unit 42 of the control station 4 and the data selector 32 of the central station 3 are partly different from those in the first embodiment, but the other operations are identical to those in the first embodiment. Hereinafter, differences from the first embodiment will be described, and redundant description will be omitted.

Although in the first embodiment determines, the receiving-station group and the beam irradiation direction are determined on the assumption that there is one transmitting station 1, a description of the present embodiment is made as to an example where the receiving station 2 can receive data from a plurality of transmitting stations.

Figure 18:
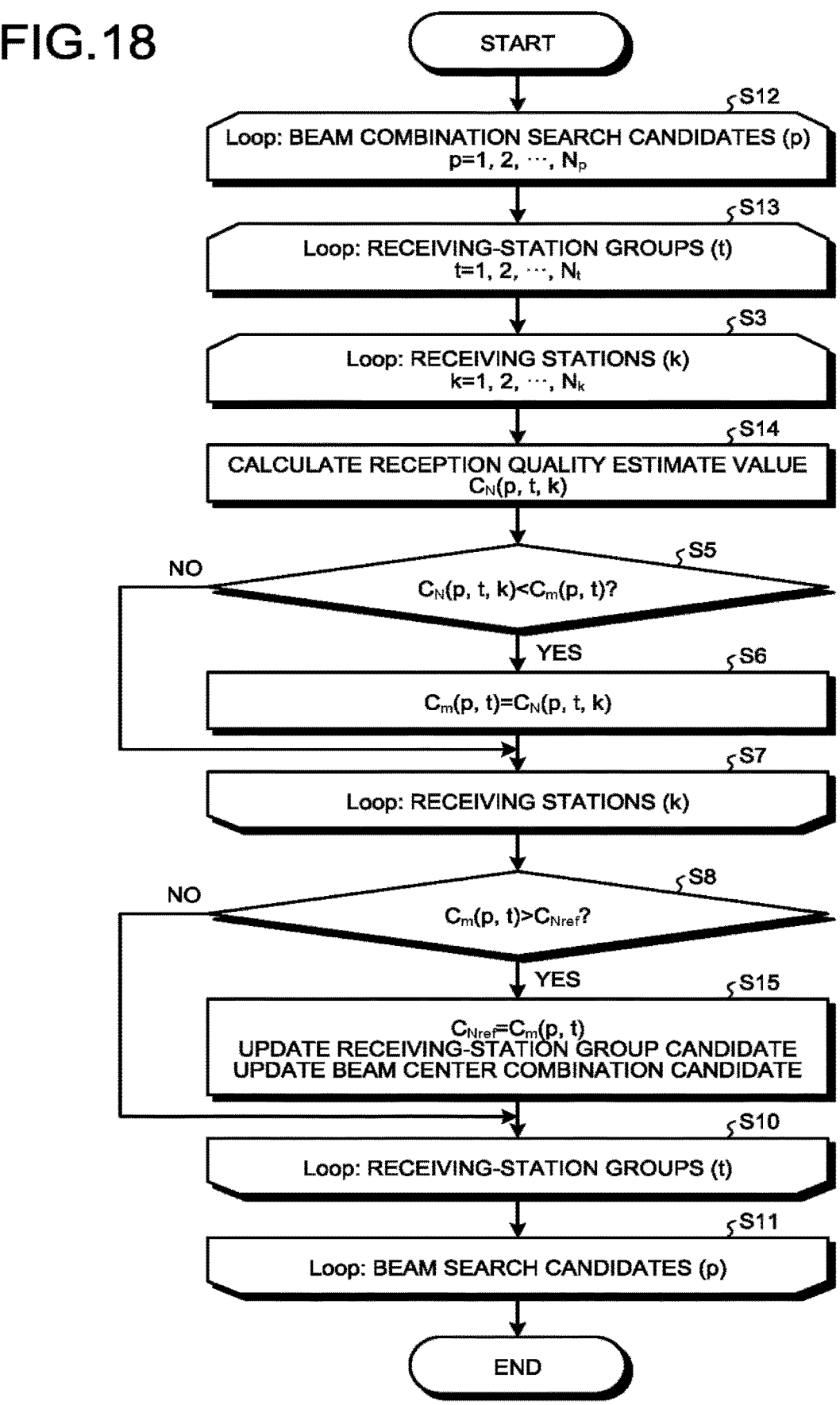
FIG. 18 is a flowchart illustrating an example of a beam determination processing procedure at the reception-quality estimating unit in the second embodiment.

FIG. 18 is a flowchart illustrating an example of a beam determination processing procedure at the reception-quality estimating unit 41 in the present embodiment. As illustrated in FIG. 18, first, the beam control unit 42 starts a loop for all beam combination search candidates (step S12). In this loop, where p is a variable used for identifying a beam combination search candidate, p=1, 2, . . . , $N_p$ is a condition of the loop. For example, a beam center candidate of each transmitting station is determined in accordance with the value of p in such a manner that when p=1, a first beam center candidate of the transmitting station 1-1 and a first beam center candidate of the transmitting station 1-2 are used, and when p=2, the first beam center candidate of the transmitting station 1-1 and a second beam center candidate of the transmitting station 1-2 are used. $N_p$ is the total number of the beam combination search candidates, but unlike in the first embodiment, is the total number of the combinations of the beam centers of a plurality of the transmitting stations. Specifically, when the two transmitting stations simultaneously perform transmission, $N_p$ is $N_1 \times N_1$. Here, it is assumed that the two transmitting stations have the same configuration. When two transmitting stations are different in transmitting antenna specifications, the total number of the beam search candidates may be determined for each transmitting station, and the value obtained by multiplying the total numbers of the beam search candidates for all the transmitting stations together may be designated at the reference character "$N_p$".

Next, the beam control unit 42 starts a loop for receiving-station-group combinations (step S13). In this loop, where t is a variable used for identifying the receiving-station-group combination, t=1, 2, . . . , N is a condition of the loop. N is the total number of the receiving-station-group combinations. The receiving-station-group combination means the receiving station groups determined on a transmitting station-by-transmitting station basis. For example, the receiving stations constituting the receiving-station group are determined for each transmitting station in accordance with the value of t in such a manner that when t=1, the receiving-station group of the transmitting station 1-1 is formed of the receiving station 2-1 and the receiving station 2-2, and the receiving-station group of the transmitting station 1-2 is formed of the receiving station 2-3 and the receiving station 2-4, and when t=2, the receiving-station group of the transmitting station 1-1 is formed of the receiving station 2-2 and the receiving station 2-4, and the receiving-station group of the transmitting station 1-2 is formed of the receiving station 2-1 and the receiving station 2-3. In this case, the receiving-station group of the transmitting station 1-1 and the receiving-station group of the transmitting station 1-2 are set so as not to include receiving station in common.

Step S3 is identical to step S3 in the first embodiment except the receiving station loop is a loop for the total number of the receiving stations 2 belonging to the receiving-station group of the transmitting station 1-1 and the receiving stations 2 belonging to the receiving-station group of the transmitting station 1-2. After step S3, the beam control unit 42 instructs the reception-quality estimating unit 41 to calculate a reception-quality estimate value $C_N(p, t, k)$ (step S14). At this time, in the present embodiment, the reception-quality estimating unit 41 calculates the reception-quality estimate value $C_N(p, t, k)$, taking inter-beam interference into consideration as described below. Step S5 to step S8 after step S13 are identical to step S5 to step S8 in the first embodiment except that in place of the variable i in the first embodiment, the above-described variable p is used, and in place of the variable j in the first embodiment, the above-described variable t is used.

When Yes in step S8, the beam control unit 42 sets $C_{Nref}=C_m(p, t)$, such that the receiving-station group candidate to be selected is updated to "t", and the beam center combination candidate to be selected is updated to "p" (step S15). Step S10 to step S11 after step S15 are identical to step S10 to step S11 in the first embodiment.

Figure 19:
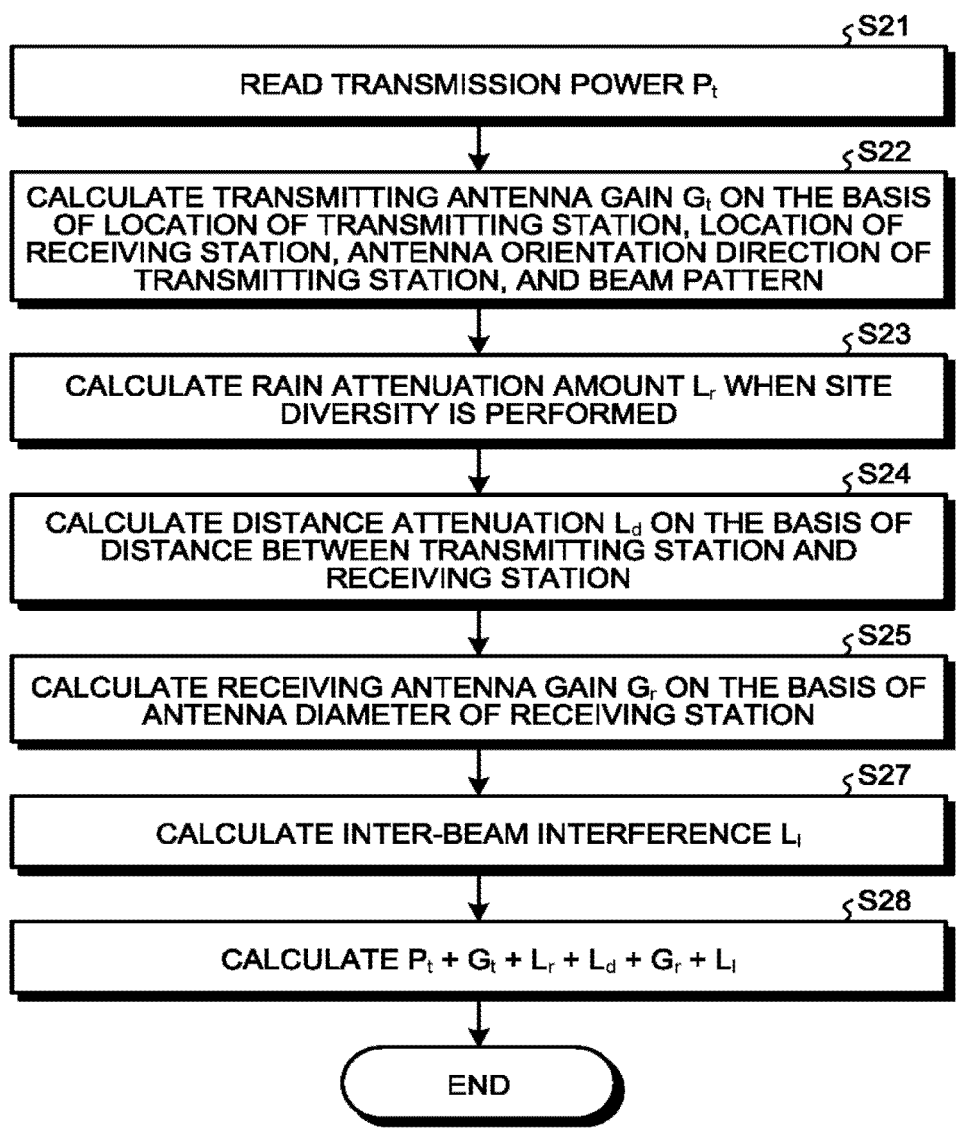
FIG. 19 is a diagram illustrating an example of a processing procedure of calculating a reception-quality estimate value in the second embodiment.

In the present embodiment, in step S14, the reception-quality estimate value $C_N(p, t, k)$ is calculated with inter-beam interference taken into consideration. FIG. 19 is a flowchart illustrating an example of a processing procedure of calculating the reception-quality estimate value in the present embodiment. FIG. 19 is an example, and the procedure of calculating the reception-quality estimate value is not limited to the example in FIG. 19. Step S21 to step S25 are identical to step S21 to step S25 in the first embodiment. However, in the present embodiment, the transmission power is held for each transmitting station, and the locations of the transmitting stations are determined on a transmitting station-by-transmitting station basis.

After step S25, the reception-quality estimating unit 41 calculates inter-beam interference $L_I$ (step S27). The inter-beam interference $L_I$ is signal power received from a transmitting station other than a transmitting station for which the receiving station 2 is a reception target. In the present embodiment, a beam center candidate of the transmitting station other than the transmitting station for which the receiving station 2 is the reception target is set. The transmitting station other than the transmitting station for which the receiving station 2 is the reception target is referred to as a non-target transmitting station. The reception-quality estimating unit 41 can calculate an interference power received from the non-target transmitting station on the basis of the beam center candidate of the non-target transmitting station, a beam pattern of the non-target transmitting station, a transmission power of the non-target transmitting station, and the locations of the non-target transmitting station and the receiving station 2. That is, $P_t+G_t+L_r+L_d+G_r$ is $L_I$ when the non-target transmitting station is regarded as a transmitting station. However, $G_r$ in this case is a receiving antenna gain provided when the antenna orientation direction of the receiving station is directed not to the non-target transmitting station but to a desired transmitting station. Since the reception quality is expressed as a SINR, the interference power has a negative value in a logarithmic representation.

The reception-quality estimating unit 41 calculates $P_t+G_t+L_r+L_d+L_I$, defines the calculated value as a reception-quality estimate value (step S28), and completes the processing.

As in the first embodiment, on the basis of the result of the selection made by the beam control unit 42, the control station 4 notifies the transmitting stations 1-1 and 1-2 of the beam orientation directions, and notifies the receiving stations 2 of the orientation directions of the receiving antennas. As in the first embodiment, the control station 4 determines the encoding scheme, the modulation scheme, and others, and notifies the transmitting stations 1-1 and 1-2 and the receiving stations 2 of these determined ones. However, when the reception-quality estimate value of the receiving station 2 in the selected receiving-station group is less than a desired value, any of the transmitting stations is excluded from the transmission targets, and the processing illustrated in FIG. 18 is executed again on the remaining transmitting station(s). This can prevent data transmission speed from decreasing more than necessary due to an increase in inter-beam interference. For a criterion of selecting the transmitting station 1 that is to be excluded from the transmission targets, for example, priority may be given to each transmitting station in accordance with, for example, the importance of data held by the data generation unit 11 of each transmitting station, to exclude a low-priority transmitting station 1.

When the data selector of the central station 3 acquires the decoded data from each receiving station 2, the data selector 32 manages data missing and duplication for each piece of data transmitted from the same transmitting station, to output a continuous data string. The relationship between the transmitting station and the receiving stations 2 constituting the receiving-station group associated with the transmitting station is notified from the control station 4 to the central station 3.

Figure 20:
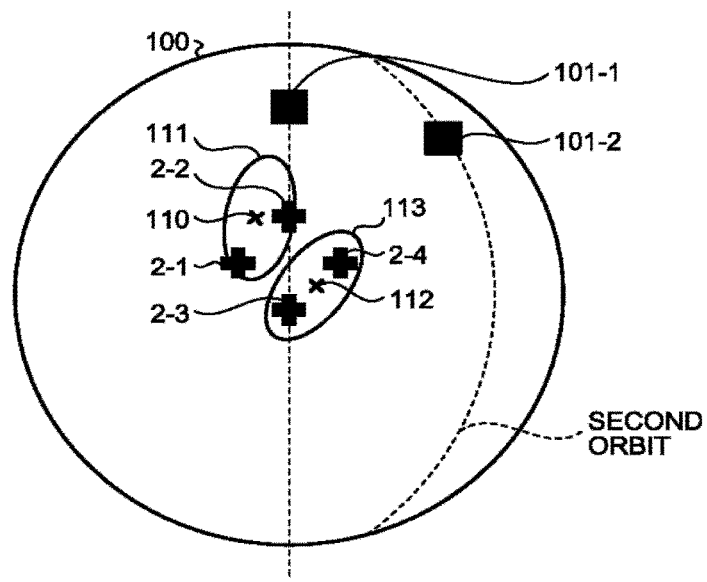
FIG. 20 is a diagram illustrating an example of beam irradiation directions selected by the beam determination processing in the second embodiment.

FIG. 20 is a diagram illustrating an example of beam irradiation directions selected by the beam determination processing in the present embodiment. FIG. 20 illustrates a case where a satellite 101-1 in which the transmitting station 1-1 is mounted and a satellite 101-2 in which the transmitting station 1-2 is mounted can simultaneously emit beams to the receiving stations 2-1 to 2-4. A beam center 110 and a footprint 111 show the beam center of the transmitting station 1-1 and the footprint of the beam, respectively. A beam center 112 and a footprint 113 show beam center of the transmitting station 1-2 and the footprint of the beam, respectively. Thus, when a plurality of the transmitting stations emit the beams to the receiving stations in close proximity, the receiving stations 2 can be affected by the beam transmitted from the transmitting station other than the transmitting station for which the receiving station 2 is the reception target. In the present embodiment, as described above, the reception-quality estimate value is estimated taking into consideration the inter-beam interference, that is, the interference power transmitted from the transmitting station other than the transmitting station for which the receiving station is the reception target, and the receiving-station group and the beam irradiation direction of each transmitting station are selected so as to maximize the reception-quality estimate values. Thus, even when the plurality of the transmitting stations simultaneously transmits the data, the receiving stations 2 can maintain the high received signal quality.

As described above, in the data transmission system in which the plurality of the transmitting stations transmit the data to the central station 3 through the receiving stations 2 in the present embodiment, the control station 4 estimates the reception-quality estimate values, taking account of the interference power from other transmitting stations, and selects the receiving-station group and the beam irradiation direction for each transmitting station, on the basis of the reception-quality estimate values. This allows the data to be simultaneously transmitted from the different transmitting stations, thereby achieving the increase in data transmission capacity of the entire system.

Third Embodiment

Figure 21:
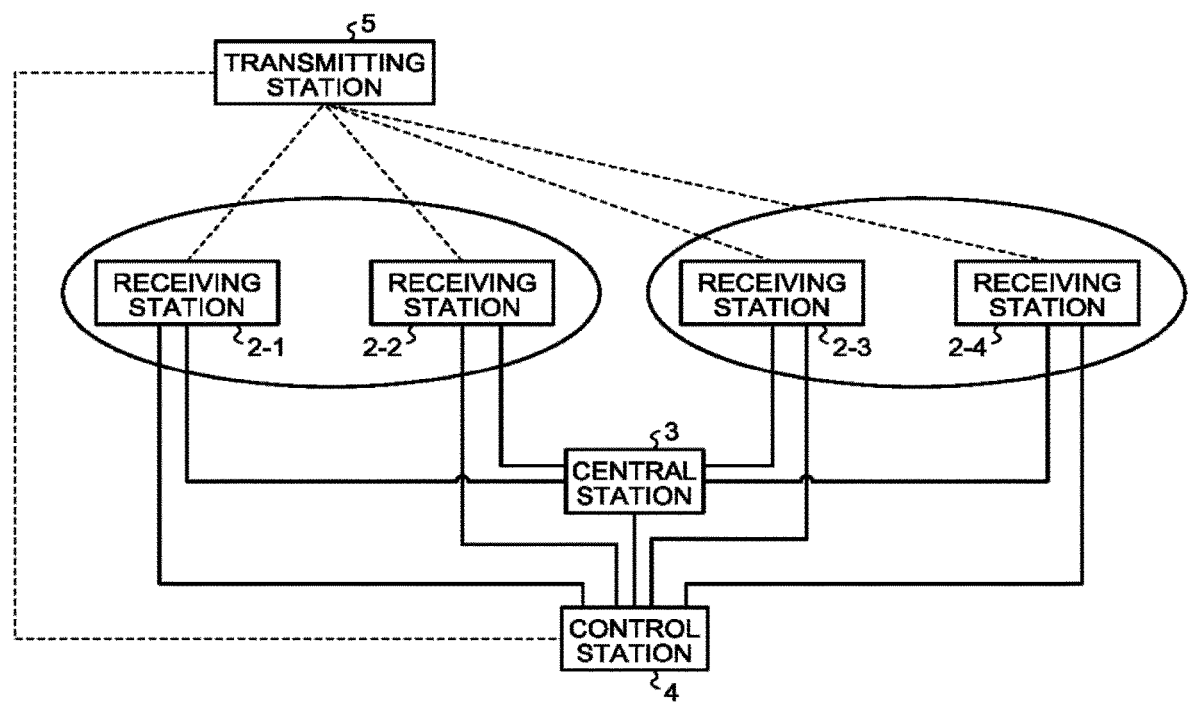
FIG. 21 is a diagram illustrating a configuration example of a data transmission system according to a third embodiment.

FIG. 21 is a diagram illustrating a configuration example of a data transmission system according to a third embodiment of the present invention. The data transmission system in the present embodiment includes the transmitting station 5, the receiving stations 2-1 to 2-4, the central station 3, and the control station 4. Although FIG. 21 illustrates only four receiving stations, the number of the receiving stations is not limited to this. The configurations of the receiving stations 2, the central station 3, and the control station 4 are identical to those of the receiving stations 2, the central station 3, and the control station 4 in the first embodiment. In the present embodiment, operations at the transmitting station 5, the reception-quality estimating unit 41, the code modulation control unit 43, and the beam control unit 42 of the control station 4, and the data selector 32 of the central station 3 are partly different from those in the first embodiment, but the other operations are identical to those in the first embodiment. Hereinafter, differences from the first embodiment will be described, and redundant description will be omitted.

Figure 22:
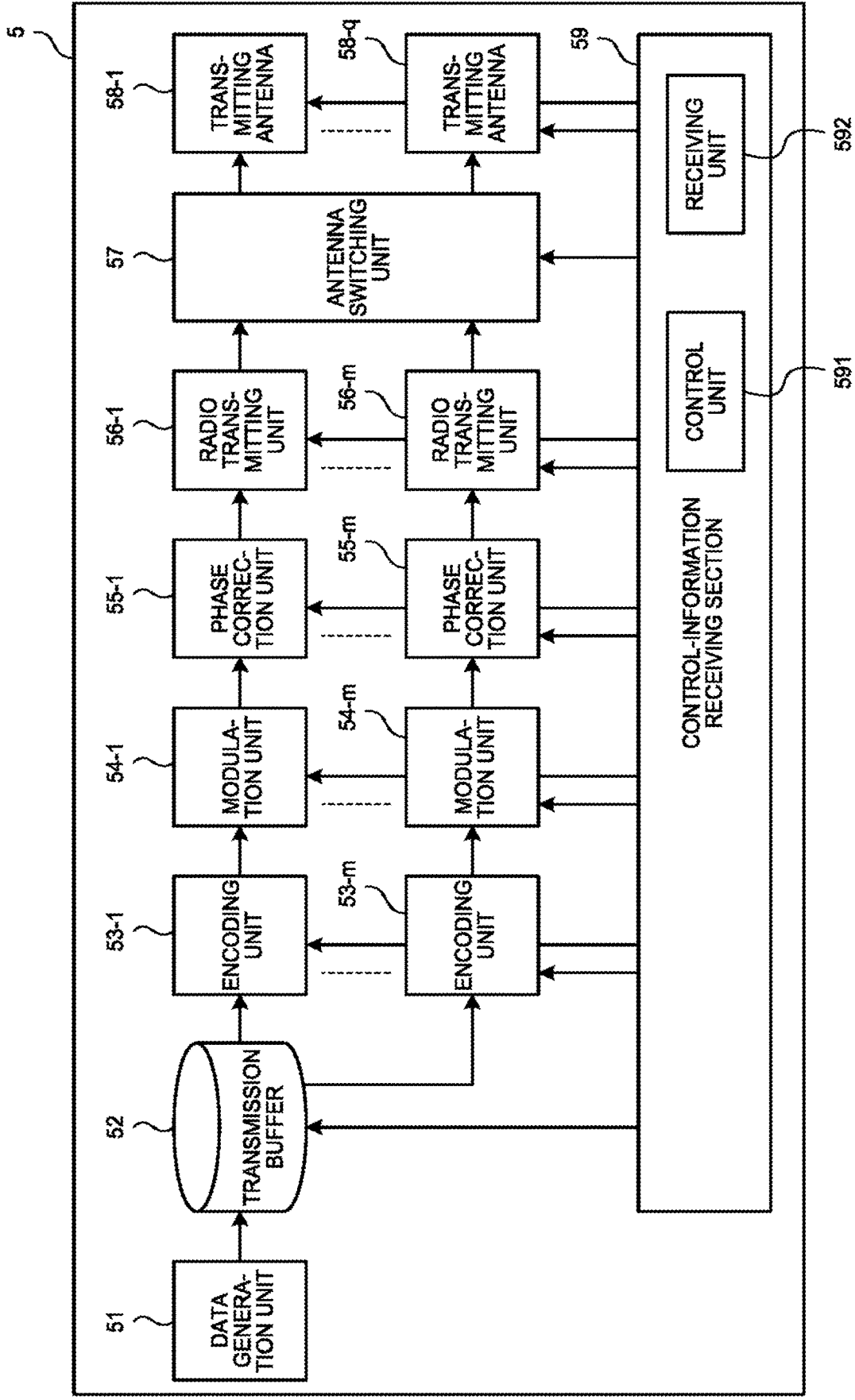
FIG. 22 is a diagram illustrating a configuration example of a transmitting station in the third embodiment.

FIG. 22 is a diagram illustrating a configuration example of the transmitting station 5 in the present embodiment. As illustrated in FIG. 22, the transmitting station 5 in the present embodiment includes a data generation unit 51, a transmission buffer 52, encoding units 53-1 to 53-$m$, modulation units 54-1 to 54-$m$, phase correction units 55-1 to 55-$m$, radio transmitting unit 56-1 to 56-$m$, an antenna switching unit 57, transmitting antennas 58-1 to 58-$q$, and a control-information receiving section 59. The reference character "m" is an integer greater than or equal to one, and the reference character "q" is an integer greater than or equal to two. The m and q may be the same or may be different.

The data generation unit 51 and the transmission buffer 52 are identical to the data generation unit 11 and the transmission buffer 12 in the first embodiment, respectively. The encoding units 53-1 to 53-$m$ encode data output from the transmission buffer 52, individually. The modulation units 54-1 to 54-$m$ modulate the data encoded by the encoders 53-1 to 53-$m$. The phase correction units 55-1 to 55-$m$ correct the phase of the data modulated by the modulators 54-1 to 54-$m$. The radio transmitting units 56-1 to 56-$m$ convert the signals with the phase corrected by the phase correction units 55-1 to 55-$m$, to a radio transmission frequency band, amplifies this converted signal, and inputs the amplified signal to the antenna switching unit 57. The antenna switching unit 57 outputs the data input from the radio transmitting unit 56-1 to 56-$m$ to one or more of the transmitting antennas 58-1 to 58-$q$ in accordance with an instruction from the control-information receiving section 59. The control-information receiving section 59 receives the control information from the control station 4, and controls the operations of parts constituting the transmitting station 5. A receiving unit 592 of the control-information receiving section 59 receives the control information from the control station 4 and inputs the received control information to a control unit 391. The control unit 591 of the control-information receiving section 59 controls the operations of the parts constituting the transmitting station 5 on the basis of the input control information.

As in the first embodiment, the data generation unit 51, the control unit 591 in the control-information receiving section 59, the encoding units 53-1 to 53-$m$, and the modulation units 54-1 to 54-*m* may be dedicated hardware, or may be a control circuit including a memory and a CPU that executes programs stored in the memory. The phase correction units 55-1 to 55-*m* may be dedicated hardware, or may be a control circuit including a memory and a CPU that executes programs stored in the memory.

Next, the operation of the transmitting station 5 in the present embodiment will be described. The data generation unit 51 of the transmitting station 5 generates data and stores the data in the transmission buffer 52. The transmission buffer 52 outputs to one of the encoding units 53-1 to 53-*m* specified by the control-information receiving section 59, data in an amount of transfer specified by the control-information receiving section 59 at a time specified by the control-information receiving section 59. The time specified by the control-information receiving section 59 is identical to that in the first embodiment. As described below, encoding schemes of the encoding units 53-1 to 53-*m* may be different, and thus the amount of transfer may be different in value between the encoding units 53-1 to 53-*m*. The transmission buffer 52 may output to the encoding units 53-1 to 53-*m* the same data or different pieces of data. For example, when the transmission buffer 52 holds 100 megabytes of data, 1 megabyte at the beginning of the buffer may be output to the encoding units 53-1, and the next 1 megabyte may be output to the encoding unit 53-2. Alternatively, 1 megabyte at the beginning of the buffer may be replicated to be output to the encoding unit 53-1 and the encoding unit 53-2, individually.

When the encoding units 53-1 to 53-*m* receive the data from the transmission buffer 52, the encoding units encode the data by an encoding scheme specified by the control-information receiving section 59. The encoders 53-1 to 53-*m* may perform the encoding by the different encoding schemes. Regarding the individual encoding of the encoding units 53-1 to 53-*m*, as in the first embodiment, the encoding scheme may be notified by the control station 4, or may be changed in a predetermined change pattern.

The modulation units 54-1 to 54-*m* modulate the data encoded by the encoding units 53-1 to 53-*m* by a modulation scheme specified by the control-information receiving section 59. Regarding the individual modulation of the modulation units 54-1 to 54-*m*, as in the first embodiment, the modulation scheme may be notified by the control station 4, or may be changed in a predetermined change pattern. The modulation units 54-1 to 54-*m* may perform the modulation by the different modulation schemes.

The phase correction units 55-1 to 55-*m* delay the modulation data modulated by the modulation units 54-1 to 54-*m* by a delay time specified by the control-information receiving section 59, that is, a delay time corresponding to a phase correction value. The delaying method may stop output of data for a period of a specified delay time, that is, provide no output, or output any known data or the like for a period of a specified delay time, for example. The phase correction units may output data with different delay times.

The delay time specified by the control-information receiving section 59 may be specified by the control station 4, or use a value preset by the transmitting station 5. Specifically, for example, the delay time specified by the control-information receiving section 59 can be set in accordance with a switching period caused by a path in the antenna switching unit 57 described below. For example, it is assumed that the antenna switching unit 57 switches from a state of outputting signals input from the phase correction unit 55-1 to the transmitting antenna 58-1 to a state of outputting signals input from the phase correction unit 55-1 to the transmitting antenna 58-2. When this switching occurs, the control-information receiving section 59 delays all pieces of data output from the phase correction units 55-1 to 55-*m* for this switching period. As a result, the timings of output by the antenna switching unit 57 to the transmitting antennas 58-1 to 58-*q* are made to be uniform. In other words, the phase correction units 55-1 to 55-*m* delay and output the data so as to correct the delay difference due to the antenna switching unit 57 switching the transmitting antenna. That is, a delay difference between the transmission signals caused by the switching of the transmitting antenna is corrected by the phase correction units 55-1 to 55-*m*.

When the radio transmitting units 56-1 to 56-*m* receive the data from the phase correction units 55-1 to 55-*m*, the radio transmitting units 56-1 to 56-*m* frequency-convert the modulated data with a frequency specified by the control-information receiving section 59, and outputs this frequency-converted data to the antenna switching unit 57. For the selection of the frequency, as in the first embodiment, the control station 4 may specify the frequency, or the frequency may be changed in a predetermined change pattern. The different frequencies may be specified for the radio transmitting units 56-1 to 56-*m*.

The antenna switching unit 57 outputs the signal input from the radio transmitting units 56-1 to 56-*m* to any of the transmitting antennas 58-1 to 58-*q* through the path specified by the control-information receiving section 59. The path is information indicating to which one of the transmitting antennas 58-1 to 58-*q* each of the signals input from the radio transmitters 56-1 to 56-*m* should be output. The control-information receiving section 59 indicates the specified path to the antenna switcher 57 in accordance with the path notified by the control information from the control station 4.

The antenna switching unit 57 may split one or more of the signals input from the radio transmitting units 56-1 to 56-*m* each into two or more with a splitter or the like, and output the split signals to two or more of the transmitting antennas 58-1 to 58-*q*. When the antenna switching unit 57 requires a time for switching, that is, a switching period, the control-information receiving section 59 may instruct the above-described transmission buffer 52 to stop the output from the transmission buffer 52 in synchronization with the switching period. In this case, there is no need for the phase correction units 55-1 to 55-*m* to perform the processing to delay the signals by the switching period. The antenna switching unit 57 may provide no output for the switching period, or the control-information receiving section 59 may instruct the phase correction units 55-1 to 55-*m* to output any known data, for example, for the switching period so that the phase correction units to 55-*m* output the known data or the like. That is, the transmitting station 5 may transmit the known data during the switching period in which the antenna switcher 57 switches the transmitting antenna, instead of transmitting the transmission data during the switching period.

When the signals are input from the antenna switching unit 57 to the transmitting antennas 58-1 to 58-*q*, the transmitting antenna 58-1 to 58-*q* transmit the signals in irradiation directions specified by the control-information receiving section 59, individually. Here, the means for changing the irradiation directions of the transmitting antennas 58-1 to 58-*q* may be means for mechanically change the antenna directions as with the transmitting antenna 16 in the first embodiment, or be implemented by a phased array antenna or the like.

When the receiving stations 2 receive the signals from the transmitting station 5, the receiving stations output the decoded data to the central station as in the first embodiment. Upon receiving the decoded data from the receiving stations 2, the central station 3 generates the continuous data string as in the first embodiment.

Next, the operation of the control station 4 in the present embodiment will be described. The operation of determining a beam irradiation direction of the transmitting station 5, a combination of the receiving stations 2, a modulation scheme, an encoding scheme, and others will be described. In the present embodiment, except for some differences described below, the beam irradiation direction of the transmitting station 5 and the combination of the receiving stations 2 are determined in the same procedure as in the flowchart illustrated in FIG. 11 in the first embodiment.

The present embodiment differs from the first embodiment in that the beam of each of the transmitting antennas 58-1 to 58-$q$ is determined, and that one of the transmitting antennas 58-1 to 58-$q$ is determined as the transmitting antenna for which each receiving station is the reception target. For example, first, the number of the transmitting antennas to be used in transmission for the site diversity is determined, and the same processing as in FIG. 11 in the first embodiment, or processing to which the processing in FIG. 11 in the first embodiment is partly changed is performed, in accordance with the number of the transmitting antennas used. For example, when the number of the transmitting antennas used for the site diversity is one, the same processing as in FIG. 11 in the first embodiment can be performed. At this time, the transmitting antenna used for the site diversity can be desirably selected from the transmitting antennas 58-1 to 58-$q$. In this case, unselected ones of the transmitting antennas 58-1 to 58-$q$ may be used for transmission of another data at a different frequency.

When the number of transmitting antennas used for the site diversity is set at two, for example, the two transmitting antennas transmit the same data, and the two transmitting antennas transmit the data to the receiving stations, individually. This can achieve the high received signal quality even when the footprint is narrow. The two transmitting antennas transmit the data to the receiving stations, individually.

The beam selection method used when the number of transmitting antennas set to be two includes setting a combination of beam center coordinates of the two transmitting antennas as one beam search candidate in step S1 in FIG. 11. For example, when the transmitting antenna 58-1 and the transmitting antenna 58-2 are used for the site diversity, the beam center coordinates of each transmitting antenna are determined in accordance with the "i" in such a manner that when i=1, the beam center coordinates of the transmitting antenna 58-1 are (a, b), and the beam center coordinates of the transmitting antenna 58-2 are (c, d), and when i=2, the beam center coordinates of the transmitting antenna 58-1 are (a, b), and the beam center coordinates of the transmitting antenna 58-2 are (e, f). The subsequent processing is identical to that in FIG. 11. In the calculation of the reception-quality estimate value in step S4, as in the second embodiment, the interference power caused by the beam other than the reception target beam may be taken into consideration.

When the elevation angle to the receiving station 2 differs depending on the location of the transmitting station 5, for example, the number of the transmitting antennas used for the site diversity may be changed, in accordance with the elevation angle. For example, when the elevation angle is smaller than a threshold, the beam irradiation direction and the receiving-station group are selected under a first condition that is the condition that the number of the transmitting antennas used for the site diversity is one. When the elevation angle is larger than or equal to the threshold, the beam irradiation directions and the receiving-station groups are selected under a second condition that is the condition that the number of transmitting antennas used for site diversity is two. The elevation angle differs depending on the locations of the receiving stations 2. For the elevation angle used in the above-described determination, the elevation angle of the transmitting station 5 as viewed from a representative one of the receiving stations 2 present in a certain area on the ground is used. For example, the elevation angle of the transmitting station 5 as viewed from the receiving station 2 near the center of the certain area can be used.

Figure 23:
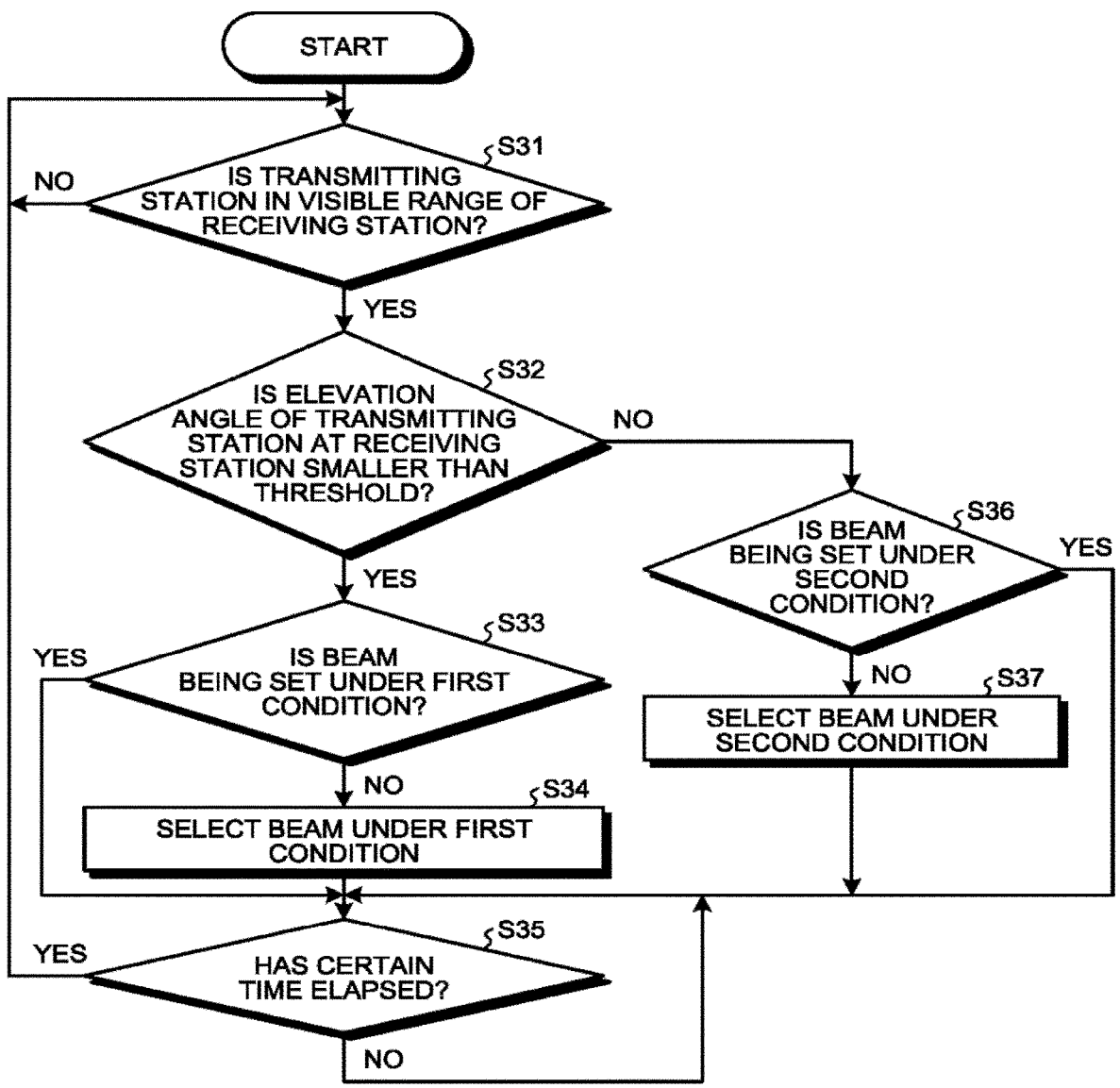
FIG. 23 is a flowchart illustrating an example of a processing procedure when a selection condition is changed in accordance with an elevation angle in the third embodiment.

FIG. 23 is a diagram illustrating an example of a processing procedure when the selection condition is changed in accordance with the elevation angle in the present embodiment. For example, the beam control unit 42 calculates the elevation angle of the transmitting station 5 as viewed from the receiving station 2 to determine whether the transmitting station 5 is in a visible range of the receiving station 2 or not (step S31). In the determination of the visible range, for example, when the elevation angle is larger than or equal to a certain value, it can be determined that the transmitting station 5 is in the visible range. The certain value is a value smaller than a threshold used in step S32 described below, and is about five degrees, for example. When the transmitting station 5 is in the visible range of the receiving station 2 (Yes in step S31), the beam control unit 42 determines whether the elevation angle of the transmitting station 5 at the receiving station is smaller than the threshold or not (step S32). When the elevation angle of the transmitting station at the receiving station 2 is smaller than the threshold (Yes in step S32), the beam control unit 42 determines whether a beam is being set under the first condition or not (step S33). When the beam is not being set under the first condition (No in step S33), the beam control unit 42 selects a beam under the first condition (step S34), and determines whether a certain period of time has elapsed since the completion of the selection processing or not (step S35). When the certain period of time has elapsed since the completion of the selection processing (Yes in step S35), the beam control unit 42 returns to step S31. When the selection processing is performed in step S34, the control station 4 notifies the transmitting station 5 and the receiving stations 3 of an irradiation direction of the transmitting antenna and orientation directions of the receiving antennas on the basis of the result of the selection. In the present embodiment, the irradiation directions of the transmitting antennas are notified on a transmitting antenna-by-transmitting antenna basis.

When the certain period of time has not elapsed since the completion of the selection processing (No in step S35), step S35 is repeated. When the beam is being set under the first condition in step S33 (Yes in step S33) the beam control unit 42 proceeds to step S35. When the elevation angle of the transmitting station 5 at the receiving station 2 is larger than or equal to the threshold in step S32 (No in step S32), the beam control unit 42 determines whether beams are being set under the second condition or not (step S36). When the beams are not being set under the second condition (No in step S36), the beam control unit 42 selects the beams under the second condition (step S37), and proceeds to step S35. When the beams are being set under the second condition (Yes in step S36), the beam control unit 42 proceeds to step S35. When the transmitting station 5 is not in the visible range of the receiving station 2 in step S31 (No in step S31), the beam control unit 42 repeats step S31.

In the above processing, it is determined whether the elevation angle is smaller than the threshold or not at regular time intervals. When the location of the transmitting station 5 can be predicted to estimate a time at which the elevation angle becomes the threshold or greater, the beam selection under the first condition and the beam selection under the second condition may be switched on the basis of the estimated time. In the selection of the receiving stations 2 and the determination of the beam irradiation directions under the second condition, for example, the method illustrated in FIG. 18 in the second embodiment may be used. In FIG. 18, it is assumed that the two satellites emit the beams to the different locations, which can translate into a case where one satellite emits two beams for processing.

FIG. 24 is a diagram illustrating an example of the footprint of a beam of the transmitting station 5 when the beam selection according to the elevation angle in the present embodiment is performed. As illustrated in FIG. 24, when a satellite 501 in which the transmitting station 5 is mounted is located in a first position, the elevation angle of the satellite 501 or the transmitting station 5 as viewed from the ground station 2 is smaller than the threshold, so that the beam is selected under the first condition to form one beam for covering a plurality of the receiving stations. Thus, the receiving stations 2-5 and 2-6 are within a footprint 120. When the satellite 501 is located in a second position, the elevation angle is larger than or equal to the threshold, so that the beams are selected under the second condition to form two beams for covering the receiving stations. In this case, the receiving station 2-6 is located within a footprint 121 of one beam of the transmitting station 5, and the receiving station 2-7 is located within a footprint 122 of the other beam of the transmitting station 5. When the satellite 501 is located in a third position, the elevation angle is again smaller than the threshold, so that the beam is selected under the first condition to form one beam for covering a plurality of the receiving stations. Thus, the receiving stations 2-6 and 2-7 are within a footprint 123. As above, on the basis of whether the elevation angle is larger than or equal to the threshold or not, the beam control unit 42 changes the number of the receiving stations 2 to be selected as the receiving stations 2 to receive the data transmitted from the transmitting antenna.

As in the case illustrated in FIG. 24 where the satellite 501 is located in the second position, the different transmitting antennas may transmit the same data or may transmit the different pieces of data to the receiving stations 2-6 and 2-7 that receive the signals transmitted from the different transmitting antennas. On the other hand, when the satellite 501 is located in the first position, the same data is transmitted from the same transmitting antenna to a plurality of the receiving stations. Specifically, when the elevation angle to the receiving station 2 is smaller than the threshold, the transmitting station 5 may transmit the same data to a plurality of the receiving stations 2, and when the elevation angle to the receiving station is larger than or equal to the threshold, the transmitting station 5 may transmit the different pieces of data to a plurality of the receiving stations 2. What data should be transmitted for each transmitting antenna can be controlled by the control station 4 indicating to the transmitting station 5 the specified amount of transfer of data output from the transmission buffer 52 and the encoding units 53-1 to 53-*m* that are transfer destinations. The same data output from the transmission buffer 52 may be encoded by the different encoding schemes and transmitted from the different transmitting antennas, individually. For example, varying a puncture pattern between the transmitting antennas for transmission enables the highly reliable transmission. For example, the control station 4 specifies different puncture patterns to two of the encoders 53-1 to 53-*m* and specifies paths of the antenna switcher 57 such that signals output from the two encoders are transmitted from the different transmitting antennas. This enables the transmission with the puncture pattern varying between the transmitting antennas.

In the example in FIG. 24, when the satellite 501 is located in the second position, the beam centers of the two beams are different. Alternatively, the beam center coordinates may be selected such that a plurality of the beams covers the same receiving station 2. In this case, the control station 4 may instruct the transmitting station 5 to perform the transmission from a plurality of transmitting antennas at the frequencies different from each other, or may control the phases of the phase correction units 55-1 to 55-*m* such that a plurality of the transmitting antennas performs the transmission at the same frequency and the phases of signals transmitted from the plurality of the transmitting antennas are made uniform. The amounts of phase correction for the control to uniform the phases of signals transmitted from a plurality of the transmitting antennas may be notified by the control station 4 to the transmitting station 5, or may be determined by the control unit 591 of the control-information receiving section 59.

The configurations illustrated in the above embodiments illustrate an example of the subject matter of the present invention, and can be combined with another known art, and can be partly omitted or changed without departing from the scope of the present invention.

REFERENCE SIGNS LIST 1, 1-1, 1-2, 5 transmitting station, 2, 2-1 to 2-7, receiving station, 3 central station, 4 control station, 11, 51 data generation unit, 12, 52 transmission buffer, 13, 53-1 to 53-*m* encoding unit, 14, 54-1 to 54-*m* modulation unit, 15, 56-1 to 56-*m* radio transmitting unit, 16, 58-1 to 58-*q* transmitting antenna, 17, 26, 59 control-information receiving section, 21 receiving antenna, 22 radio receiving unit, 23 demodulation unit, 24 decoding unit, 25, 31-1 to 31-*n* reception buffer, 32 data selector, 33 data reproducer, 34, 44 control-information transmission-reception section, 41 reception-quality estimating unit, 42 beam control unit, 43 code modulation control unit, 55-1 to 55-*m* phase correction unit, 57 antenna switching unit, 171, 261, 441, 591 control unit, 172, 262, 592 receiving unit, 442 transmitting unit, 443 transmission-reception unit.

The invention claimed is:
1. A transmitting station, comprising:
a transmitting antenna whose orientation direction is changeable; and
processing circuitry configured to
control the orientation direction of the transmitting antenna on a basis of estimated values of received signal quality at a receiving station that receives data transmitted from the transmitting antenna at an elevation angle between the transmitting station and the receiving station, a radiation pattern of the antenna of the transmitting station varying as a function of a position of the transmitting station relative to the receiving station, and set an encoding and modulation scheme, wherein
the encoding and modulation scheme is set according to a look-up table of change patterns defined by different code modulation patterns each being determined in accordance with an elevation angle between the transmitting station and the receiving station, the code modulation patterns corresponding to different groups of receiving stations, the elevation angle determining estimated values of received signal quality at the groups of receiving stations.

2. A receiving station, comprising:
processing circuitry configured to receive the data transmitted from the transmitting station according to claim 1.

3. A control station, comprising:
processing circuitry configured to
calculate estimated values of received signal quality at receiving stations in groups of receiving stations that receive data transmitted from a transmitting antenna of a transmitting station whose orientation direction is changeable at an elevation angle between the transmitting station and the receiving station, a radiation pattern of the antenna of the transmitting station varying as a function of a position of the transmitting station relative to the receiving station; and
determine the orientation direction of the transmitting antenna on a basis of the estimated values of received signal quality; and
a transmitter configured to transmit to the transmitting station the orientation direction of the transmitting antenna, wherein
the processing circuitry is configured to select one of the groups of receiving stations, based on the calculated estimated values of received signal quality, and notify the transmitting station of a code modulation pattern that is to be used, in accordance with the selected group of receiving stations, such that the transmitting station determines an encoding and modulation scheme based on the notified code modulation and a look-up table of change patterns defined by different code modulation patterns each being determined in accordance with an elevation angle between the transmitting station and the receiving station, the code modulation patterns corresponding to different groups of receiving stations, the elevation angle determining estimated values of received signal quality at the groups of receiving stations.

4. The control station according to claim 3, wherein the beam controller determines orientation directions of the transmitting antennas of the transmitting station.

5. The control station according to claim 4, wherein a modulation scheme and an encoding scheme are determined for each of the transmitting antennas, and the determined modulation schemes and encoding schemes are transmitted to the transmitting station.

6. The control station according to claim 4, wherein the beam controller changes a number of receiving stations selected as receiving stations to receive data transmitted from the transmitting antennas, on a basis of whether the elevation angle between the transmitting station and the receiving stations is larger than or equal to the threshold or not.

7. The control station according to claim 3, wherein the processing circuitry is further configured to determine the orientation direction of the transmitting antenna when the first elevation angle between the transmitting station and the receiving station changes by a threshold or more.

8. The control station according to claim 3, wherein the transmitting station is mounted in an artificial satellite, and the processing circuitry is further configured to determine the orientation direction of the transmitting antenna every time the artificial satellite circles the Earth.

9. A data transmission system, comprising:
a transmitting station;
a receiving station that receives data transmitted from the transmitting station; and
the control station according to claim 3.

10. A data transmission system comprising:
a transmitting station;
a receiving stations to receive data transmitted from the transmitting station; and
the control station according to claim 3, wherein
the transmitting station comprising:
a transmitting antenna whose orientation direction is changeable;
a controller to control the orientation direction of the transmitting antenna in accordance with an orientation direction of the transmitting antenna determined together with receiving stations to receive data transmitted from the transmitting antenna, on a basis of estimate values of received signal quality at candidates for receiving stations to receive data transmitted from the transmitting antenna;
an encoder to encode transmission data;
a modulator to modulate data encoded by the encoder;
a phase corrector to correct a phase of data modulated by the modulator; and
an antenna switcher,
wherein the transmitting antenna is q in number, wherein q is an integer greater than or equal to two,
each of the encoder, the modulator, and the phase corrector is m in number, wherein m is an integer greater than or equal to one, and
the antenna switcher outputs data having a phase corrected by the phase corrector to one or more of the q transmitting antennas, and
wherein the transmission data is not transmitted during a switching period in which the antenna switcher switches the transmitting antenna, and known data is transmitted during the switching period.

11. A data transmission system comprising:
a transmitting station;
a receiving stations to receive data transmitted from the transmitting station; and
the control station according to claim 3, wherein
the transmitting station comprising:
a transmitting antenna whose orientation direction is changeable; and
a controller to control the orientation direction of the transmitting antenna in accordance with an orientation direction of the transmitting antenna determined together with receiving stations to receive data transmitted from the transmitting antenna, on a basis of estimate values of received signal quality at candidates for receiving stations to receive data transmitted from the transmitting antenna,
wherein when an elevation angle to a receiving station is smaller than a threshold, the same data is transmitted to the receiving stations, and when an elevation angle to a receiving station is larger than or equal to the threshold, different pieces of data are transmitted to the receiving stations.

12. A control station, comprising:
processing circuitry configured to
calculate estimated values of received signal quality at each of a plurality of receiving stations in groups of receiving stations that receive data transmitted from a transmitting antenna of a transmitting station whose orientation direction is changeable at elevation angle between the transmitting station and each of the plurality of receiving stations, a radiation pattern of the antenna of the transmitting station varying as a function of a position of the transmitting station relative each of the plurality of receiving stations;
determine the orientation direction of the transmitting antenna on a basis of the estimated values of received signal quality; and
a transmitter configured to transmit to the transmitting station the orientation direction of the transmitting antenna,
wherein the processing circuitry is configured to calculate the estimated values of the received signal quality at each of the plurality of receiving stations using at least one of: a transmission power of the transmitting station; a transmitting antenna gain of the transmitting station; an amount of rain attenuation at the respective receiving station; a receiving antenna gain of the respective receiving station; and an amount of distance attenuation at the respective receiving station,
the amount of rain attenuation is an amount of rain attenuation at the respective receiving station corresponding to a joint rain attenuation amount estimate value, the joint rain attenuation amount estimated value being calculated from a target availability rate and a probability that more than one of the plurality of receiving stations that simultaneously receive the data transmitted from the transmitting station have a desired amount of rain attenuation or more, and
wherein the processing circuitry is configured to select one of the groups of receiving stations, based on the calculated estimated values of received signal quality, and notify the transmitting station of a code modulation pattern that is to be used, in accordance with the selected group of receiving stations, such that the transmitting station determines an encoding and modulation scheme based on the notified code modulation and a look-up table of change patterns defined by different code modulation patterns each being determined in accordance with an elevation angle between the transmitting station and the receiving station, the code modulation patterns corresponding to different groups of receiving stations, the elevation angle determining estimated values of received signal quality at the groups of receiving stations.

13. The control station according to claim 12, wherein the processing circuitry is further configured to calculate the transmitting antenna gain on a basis of a location of the transmitting station, a location of the respective receiving station, the antenna orientation direction of the transmitting station, and a beam pattern of the transmitting antenna.

14. The control station according to claim 12, wherein the processing circuitry is further configured to calculate the amount of distance attenuation on a basis of a distance between the transmitting station and the respective receiving station.

15. The control station according to claim 12, wherein the beam controller determines orientation directions of the transmitting antennas of a plurality of the transmitting stations, and
the reception-quality estimator determines the reception-quality estimate value on a basis of, in addition, interference power transmitted from a transmitting station other than a transmitting station for which the receiving station is a reception target.

16. The control station according to claim 12, wherein the beam controller determines orientation directions of the transmitting antennas of the transmitting station.

17. The control station according to claim 16, wherein a modulation scheme and an encoding scheme are determined for each of the transmitting antennas, and the determined modulation schemes and encoding schemes are transmitted to the transmitting station.

18. The control station according to claim 16, wherein the beam controller changes a number of receiving stations selected as receiving stations to receive data transmitted from the transmitting antennas, on a basis of whether the elevation angle between the transmitting station and the receiving stations is larger than or equal to the threshold or not.

19. The control station according to claim 12, wherein the processing circuitry is further configured to determine the orientation direction of the transmitting antenna when the first elevation angle between the transmitting station and the one of the plurality of receiving stations changes by a threshold or more.

20. The control station according to claim 12, wherein the transmitting station is mounted in an artificial satellite, and the processing circuitry is further configured to determine the orientation direction of the transmitting antenna is performed every time the artificial satellite circles the Earth.

21. A data transmission system, comprising:
a transmitting station;
a receiving station that receives data transmitted from the transmitting station; and
the control station according to claim 12.

22. A data transmission system comprising:
a transmitting station;
a receiving stations to receive data transmitted from the transmitting station; and
the control station according to claim 3, wherein
the transmitting station comprising:
a transmitting antenna whose orientation direction is changeable;
a controller to control the orientation direction of the transmitting antenna in accordance with an orientation direction of the transmitting antenna determined together with receiving stations to receive data transmitted from the transmitting antenna, on a basis of estimate values of received signal quality at candidates for receiving stations to receive data transmitted from the transmitting antenna;
an encoder to encode transmission data;
a modulator to modulate data encoded by the encoder;
a phase corrector to correct a phase of data modulated by the modulator; and
an antenna switcher,
wherein the transmitting antenna is q in number, where q is an integer greater than or equal to two,
each of the encoder, the modulator, and the phase corrector is m in number, where m is an integer greater than or equal to one, and the antenna switcher outputs data having a phase corrected by the phase corrector to one or more of the q transmitting antennas, and
wherein the phase corrector delays and outputs data so as to correct a delay difference due to switching of the transmitting antenna at the antenna switcher.

23. A data transmission system comprising:
a transmitting station;
a receiving stations to receive data transmitted from the transmitting station; and
the control station according to claim 12, wherein
the transmitting station comprising:
a transmitting antenna whose orientation direction is changeable;
a controller to control the orientation direction of the transmitting antenna in accordance with an orientation direction of the transmitting antenna determined together with receiving stations to receive data transmitted from the transmitting antenna, on a basis of estimate values of received signal quality at candidates for receiving stations to receive data transmitted from the transmitting antenna;
an encoder to encode transmission data;
a modulator to modulate data encoded by the encoder;
a phase corrector to correct a phase of data modulated by the modulator; and
an antenna switcher,
wherein the transmitting antenna is q in number, where q is an integer greater than or equal to two,
each of the encoder, the modulator, and the phase corrector is m in number, where m is an integer greater than or equal to one, and
the antenna switcher outputs data having a phase corrected by the phase corrector to one or more of the q transmitting antennas, and
wherein the phase corrector delays and outputs data so as to correct a delay difference due to switching of the transmitting antenna at the antenna switcher.

24. A data transmission system comprising:
a transmitting station;
a receiving stations to receive data transmitted from the transmitting station; and
the control station according to claim 12, wherein
the transmitting station comprising:
a transmitting antenna whose orientation direction is changeable;
a controller to control the orientation direction of the transmitting antenna in accordance with an orientation direction of the transmitting antenna determined together with receiving stations to receive data transmitted from the transmitting antenna, on a basis of estimate values of received signal quality at candidates for receiving stations to receive data transmitted from the transmitting antenna;
an encoder to encode transmission data;
a modulator to modulate data encoded by the encoder;
a phase corrector to correct a phase of data modulated by the modulator; and
an antenna switcher,
wherein the transmitting antenna is q in number, wherein q is an integer greater than or equal to two,
each of the encoder, the modulator, and the phase corrector is m in number, wherein m is an integer greater than or equal to one, and
the antenna switcher outputs data having a phase corrected by the phase corrector to one or more of the q transmitting antennas, and
wherein the transmission data is not transmitted during a switching period in which the antenna switcher switches the transmitting antenna, and known data is transmitted during the switching period.

25. A data transmission system comprising:
a transmitting station;
a receiving stations to receive data transmitted from the transmitting station; and
the control station according to claim 12, wherein
the transmitting station comprising:
a transmitting antenna whose orientation direction is changeable; and
a controller to control the orientation direction of the transmitting antenna in accordance with an orientation direction of the transmitting antenna determined together with receiving stations to receive data transmitted from the transmitting antenna, on a basis of estimate values of received signal quality at candidates for receiving stations to receive data transmitted from the transmitting antenna,
wherein when an elevation angle to a receiving station is smaller than a threshold, the same data is transmitted to the receiving stations, and when an elevation angle to a receiving station is larger than or equal to the threshold, different pieces of data are transmitted to the receiving stations.

26. A control station, comprising:
processing circuitry configured to
  calculate estimated values of received signal quality at each of a plurality of receiving stations that receives data transmitted from a transmitting antenna of a transmitting station whose orientation direction is changeable, a radiation pattern of the antenna of the transmitting station varying as a function of a position of the transmitting station relative each of the plurality of receiving stations;
  determine the orientation direction of the transmitting antenna corresponding to each of the plurality of receiving stations on a basis of the estimated values of received signal quality at each of the plurality of receiving stations; and
a transmitter configured to transmit to the transmitting station the orientation direction of the transmitting antenna corresponding to each of the plurality of receiving stations,
wherein for each combination of the orientation direction of the transmitting antenna and a group of receiving stations that simultaneously receive the data from the transmitting antenna, the processing circuitry is configured to determine a minimum value of the calculated estimated values of received signal quality at each of the plurality of receiving stations in the group of receiving stations, and
the processing circuitry is further configured to
  select a combination of the orientation direction of the transmitting antenna and the group of receiving stations having the largest determined minimum value among the determined minimum values of the calculated estimated values of received signal quality, and
  determine the selected orientation direction of the transmitting antenna as the orientation direction of the transmitting antenna.

27. A data transmission system, comprising:
a transmitting station;
a receiving station that receives data transmitted from the transmitting station; and the control station according to claim 26, wherein the
transmitting station comprising:
a transmitting antenna whose orientation direction is
changeable; and
processing circuitry configured to
control the orientation direction of the transmitting
antenna on a basis of estimated values of received
signal quality at the receiving station that receives
the data transmitted from the transmitting antenna at
an elevation angle between the transmitting station
and the receiving station, a radiation pattern of the
antenna of the transmitting station varying as a
function of a position of the transmitting station
relative to the receiving station, and
set an encoding and modulation scheme, wherein
the encoding and modulation scheme is set according to
a look-up table of change patterns defined by different
code modulation patterns each being determined in
accordance with an elevation angle between the transmitting station and the receiving station, the code
modulation patterns corresponding to different groups
of receiving stations, the elevation angle determining
estimated values of received signal quality at the
groups of receiving stations.

28. A data transmission system comprising:
a transmitting station;
a receiving stations to receive data transmitted from the
transmitting station; and
the control station according to claim 26, wherein
the transmitting station comprising:
a transmitting antenna whose orientation direction is
changeable;
a controller to control the orientation direction of the
transmitting antenna in accordance with an orientation
direction of the transmitting antenna determined
together with receiving stations to receive data transmitted from the transmitting antenna, on a basis of
estimate values of received signal quality at candidates
for receiving stations to receive data transmitted from
the transmitting antenna;
an encoder to encode transmission data;
a modulator to modulate data encoded by the encoder;
a phase corrector to correct a phase of data modulated by
the modulator; and
an antenna switcher,
wherein the transmitting antenna is q in number, wherein
q is an integer greater than or equal to two,
each of the encoder, the modulator, and the phase corrector is m in number, wherein m is an integer greater than
or equal to one, and
the antenna switcher outputs data having a phase corrected by the phase corrector to one or more of the q
transmitting antennas, and
wherein the phase corrector delays and outputs data so as
to correct a delay difference due to switching of the
transmitting antenna at the antenna switcher.

29. A data transmission system comprising:
a transmitting station;
a receiving stations to receive data transmitted from the
transmitting station; and
the control station according to claim 26, wherein
the transmitting station comprising:
a transmitting antenna whose orientation direction is
changeable;
a controller to control the orientation direction of the
transmitting antenna in accordance with an orientation
direction of the transmitting antenna determined
together with receiving stations to receive data transmitted from the transmitting antenna, on a basis of
estimate values of received signal quality at candidates
for receiving stations to receive data transmitted from
the transmitting antenna;
an encoder to encode transmission data;
a modulator to modulate data encoded by the encoder;
a phase corrector to correct a phase of data modulated by
the modulator; and
an antenna switcher,
wherein the transmitting antenna is q in number, wherein
q is an integer greater than or equal to two,
each of the encoder, the modulator, and the phase corrector is m in number, wherein m is an integer greater than
or equal to one, and
the antenna switcher outputs data having a phase corrected by the phase corrector to one or more of the q
transmitting antennas, and
wherein the transmission data is not transmitted during a
switching period in which the antenna switcher
switches the transmitting antenna, and known data is
transmitted during the switching period.

30. A data transmission system comprising:
a transmitting station;
a receiving stations to receive data transmitted from the
transmitting station; and
the control station according to claim 26, wherein
the transmitting station comprising:
a transmitting antenna whose orientation direction is
changeable; and
a controller to control the orientation direction of the
transmitting antenna in accordance with an orientation
direction of the transmitting antenna determined
together with receiving stations to receive data transmitted from the transmitting antenna, on a basis of
estimate values of received signal quality at candidates
for receiving stations to receive data transmitted from
the transmitting antenna,
wherein when an elevation angle to a receiving station is
smaller than a threshold, the same data is transmitted to
the receiving stations, and when an elevation angle to
a receiving station is larger than or equal to the threshold, different pieces of data are transmitted to the
receiving stations.

31. A control circuit of a transmitting station having a
transmitting antenna whose orientation direction is changeable, the control circuit comprising:
processing circuitry configured to
control the orientation direction of the transmitting
antenna on a basis of estimated values of received
signal quality at a receiving station that receives data
transmitted from the transmitting antenna at an
elevation angle between the transmitting station and
the receiving station, a radiation pattern of the
antenna of the transmitting station varying as a
function of a position of the transmitting station
relative to the receiving station, and
set an encoding and modulation scheme, wherein
the encoding and modulation scheme is set according to
a look-up table of change patterns defined by different
code modulation patterns each being determined in
accordance with an elevation angle between the transmitting station and the receiving station, the code
modulation patterns corresponding to different groups
of receiving stations, the elevation angle determining
estimated values of received signal quality at the
groups of receiving stations.

32. A non-transitory storage medium of a transmitting station having a transmitting antenna whose orientation direction is changeable, the medium storing a program which when executed by a processor performs:
controlling the orientation direction of the transmitting antenna on a basis of estimated values of received signal quality at a receiving station that receives data transmitted from the transmitting antenna at an elevation angle between the transmitting station and the receiving station, a radiation pattern of the antenna of the transmitting station varying as a function of a position of the transmitting station relative to the receiving station, and
setting an encoding and modulation scheme, wherein
the encoding and modulation scheme is set according to a look-up table of change patterns defined by different code modulation patterns each being determined in accordance with an elevation angle between the transmitting station and the receiving station, the code modulation patterns corresponding to different groups of receiving stations, the elevation angle determining estimated values of received signal quality at the groups of receiving stations.

* * * * *